US010948131B1

(12) United States Patent
Francis

(10) Patent No.: US 10,948,131 B1
(45) Date of Patent: Mar. 16, 2021

(54) BORE AND ANNULUS MONITORING PIPE BREACH DETECTION SYSTEMS AND METHODS

(71) Applicant: Trinity Bay Equipment Holdings, LLC, Houston, TX (US)

(72) Inventor: Kirk Spencer Francis, Richmond, TX (US)

(73) Assignee: Trinity Bay Equipment Holdings, LLC, Houston, TX (US)

(*) Notice: Subject to any disclaimer, the term of this patent is extended or adjusted under 35 U.S.C. 154(b) by 0 days.

(21) Appl. No.: 17/030,729

(22) Filed: Sep. 24, 2020

(51) Int. Cl.
| F17D 5/02 | (2006.01) |
| G01M 3/24 | (2006.01) |
| G01M 3/28 | (2006.01) |
| F16L 55/07 | (2006.01) |
| F16L 9/18 | (2006.01) |
| G01M 3/04 | (2006.01) |
| G01M 3/26 | (2006.01) |

(52) U.S. Cl.
CPC ............ *F17D 5/02* (2013.01); *F16L 9/18* (2013.01); *F16L 55/07* (2013.01); *G01M 3/04* (2013.01); *G01M 3/26* (2013.01); *G01M 3/28* (2013.01); *F16L 2201/30* (2013.01)

(58) Field of Classification Search
CPC ......... F16L 9/18; F16L 55/07; F16L 2201/30; F17D 5/00–06; G01M 3/00; G01M 3/04; G01M 3/18; G01M 3/24–28
See application file for complete search history.

(56) References Cited

U.S. PATENT DOCUMENTS

| 4,450,711 A * | 5/1984 | Claude .................... F16L 9/18 340/605 |
| 4,644,780 A * | 2/1987 | Jeter .................... F16L 55/005 138/104 |
| 5,279,148 A * | 1/1994 | Brandes ................ G01N 27/12 324/526 |
| 9,207,192 B1 * | 12/2015 | Focia .................... G01R 31/12 |

(Continued)

FOREIGN PATENT DOCUMENTS

EP          0589800 A1 *  3/1994    .......... F16L 58/1009

OTHER PUBLICATIONS

Atmos International, Atmos wave, https://www.atmosi.com/en/products-services/atmos-wave/, Sep. 14, 2020.

*Primary Examiner* — Nguyen Q. Ha
(74) *Attorney, Agent, or Firm* — Conrad J. Hsu

(57) ABSTRACT

Techniques for implementing a system that includes a pipe segment and a monitoring apparatus. The pipe segment includes tubing that defines a pipe bore and a fluid conduit within a tubing annulus of the pipe segment. The monitoring apparatus includes a plurality of bore sensors fluidly connected to the pipe bore of the pipe segment, an annulus sensor fluidly connected to the fluid conduit defined within the tubing annulus of the pipe segment, and a control sub-system. The control sub-system determines whether a breach is present in the tubing of the pipe segment based at least in part on first sensor data determined by the bore sensors to be indicative of a bore fluid parameter present within the pipe bore of the pipe segment and second sensor data determined by the annulus sensor to be indicative of an annulus fluid parameter present within the tubing annulus of the pipe segment.

20 Claims, 8 Drawing Sheets

(56) References Cited

U.S. PATENT DOCUMENTS

| | | | |
|---|---|---|---|
| 9,400,227 B2* | 7/2016 | Ramos | E21B 17/015 |
| 9,939,341 B2* | 4/2018 | McNab | G01M 3/38 |
| 2011/0227721 A1* | 9/2011 | Mezghani | G01M 3/18 |
| | | | 340/539.1 |
| 2012/0170610 A1* | 7/2012 | Ramos | G01M 3/28 |
| | | | 374/5 |
| 2013/0160886 A1* | 6/2013 | Wright, Jr. | F16L 39/005 |
| | | | 138/97 |
| 2018/0259111 A1* | 9/2018 | Damour | E21B 47/07 |

* cited by examiner

BORE AND ANNULUS MONITORING PIPE BREACH DETECTION SYSTEMS AND METHODS

BACKGROUND

The present disclosure generally relates to pipeline systems and, more particularly, to a monitoring apparatus that may be deployed in a pipeline system to facilitate detecting whether a breach (e.g., leak or inadvertent opening) is present in the pipeline system.

Pipeline systems are often used to transport (e.g., convey) fluid, such as liquid and/or gas, from a fluid source to a fluid destination. For example, a pipeline system may be used to transport one or more hydrocarbons, such as crude oil, petroleum, natural gas, or any combination thereof. Additionally or alternatively, a pipeline system may be used to transport one or more other types of fluid, such as produced water, potable water, fresh water, fracturing fluid, flowback fluid, carbon dioxide, or any combination thereof.

To facilitate transporting fluid, a pipeline system may include one or more pipe segments in addition to pipe (e.g., midline and/or end) fittings, which are used to connect a pipe segment to another pipeline component, such as another pipe fitting, another pipe segment, a fluid source, and/or a fluid destination. Generally, a pipe segment includes tubing, which defines (e.g., encloses) a pipe bore that provides a primary fluid conveyance (e.g., flow) path through the pipe segment. More specifically, the tubing of a pipe segment may be implemented to facilitate isolating (e.g., insulating) fluid being conveyed within its pipe bore from environmental conditions external to the pipe segment, for example, to reduce the likelihood of the conveyed (e.g., bore) fluid being lost to the external environmental conditions and/or the external environmental conditions contaminating the conveyed fluid (e.g., clean and/or potable water).

In any case, at least in some instances, the tubing of a pipe segment deployed in a pipeline system may become damaged such that its structural integrity is compromised. For example, a breach (e.g., hole or inadvertent opening) through the pipe segment tubing may result in excessive (e.g., undesired) fluid flow from the pipe segment directly out into environmental conditions external to the pipe segment and/or from the external environmental conditions directly into the pipe segment. In other words, at least in some instances, operating a pipeline system while a pipe segment deployed therein has a breach may affect (e.g., reduce) operational efficiency and/or operational reliability of the pipeline system, for example, due to the breach resulting in conveyed fluid being lost to and/or contaminated by external environmental conditions.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a system includes a pipe segment and a monitoring apparatus. The pipe segment includes tubing that defines a pipe bore and a fluid conduit within a tubing annulus of the pipe segment. The monitoring apparatus includes bore sensors fluidly connected to the pipe bore of the pipe segment, an annulus sensor fluidly connected to the fluid conduit defined within the tubing annulus of the pipe segment, and a control sub-system communicatively coupled to the bore sensors and the annulus sensor. The control sub-system determines whether a breach is present in the tubing of the pipe segment based at least in part on first sensor data determined by the bore sensors to be indicative of a bore fluid parameter present within the pipe bore of the pipe segment and second sensor data determined by the annulus sensor to be indicative of an annulus fluid parameter present within the tubing annulus of the pipe segment.

In another embodiment, a method of operating a monitoring apparatus deployed in a pipeline system includes determining, using a control sub-system in the monitoring apparatus, a bore monitoring integrity state that indicates whether a breach is potentially present in a pipe segment deployed in the pipeline system based at least in part on first sensor data determined by a plurality of bore sensors in the monitoring apparatus to be indicative of one or more bore fluid parameters present within a pipe bore of the pipe segment. Additionally, the method includes determining, using the control sub-system, an annulus monitoring integrity state that indicates whether a breach is potentially present in the pipe segment based at least in part on second sensor data determined by one or more annulus sensors in the monitoring apparatus to be indicative of one or more annulus fluid parameters present within free space defined in a tubing annulus of the pipe segment. Furthermore, the method includes determining, using the control sub-system, a cross-checked integrity state that indicates whether a breach is actually present in the pipe segment at least in part by cross-checking the bore monitoring integrity state and the annulus monitoring integrity state against one another.

In another embodiment, a monitoring apparatus includes bore sensors, one or more annulus sensors, and a control sub-system to be communicatively coupled to the bore sensors and the one or more annulus sensors. The bore sensors are to be fluidly connected to a pipe bore of a pipe segment to enable the plurality of bore sensors to determine first sensor data indicative of fluid pressure present within the pipe bore of the pipe segment. The one or more annulus sensors are to be fluidly connected to free space defined within a tubing annulus of the pipe segment to enable the one or more annulus sensors to determine second sensor data indicative of fluid pressure, fluid temperature, fluid flow rate, fluid composition, or any combination thereof present within the tubing annulus of the pipe segment. The control sub-system determines a bore monitoring integrity state that indicates whether a breach is potentially present in the pipe segment based on the first sensor data indicative of fluid pressure present within the pipe bore of the pipe segment, determines an annulus monitoring integrity state that indicates whether a breach is potentially present in the pipe segment based on the second sensor data indicative of the fluid pressure, the fluid temperature, the fluid flow rate, the fluid composition, or any combination thereof present within the tubing annulus of the pipe segment, and determine a cross-checked integrity state that indicates whether a breach is actually present in the pipe segment based on the bore monitoring integrity state and the annulus monitoring integrity state.

DETAILED DESCRIPTION

Figure 1:
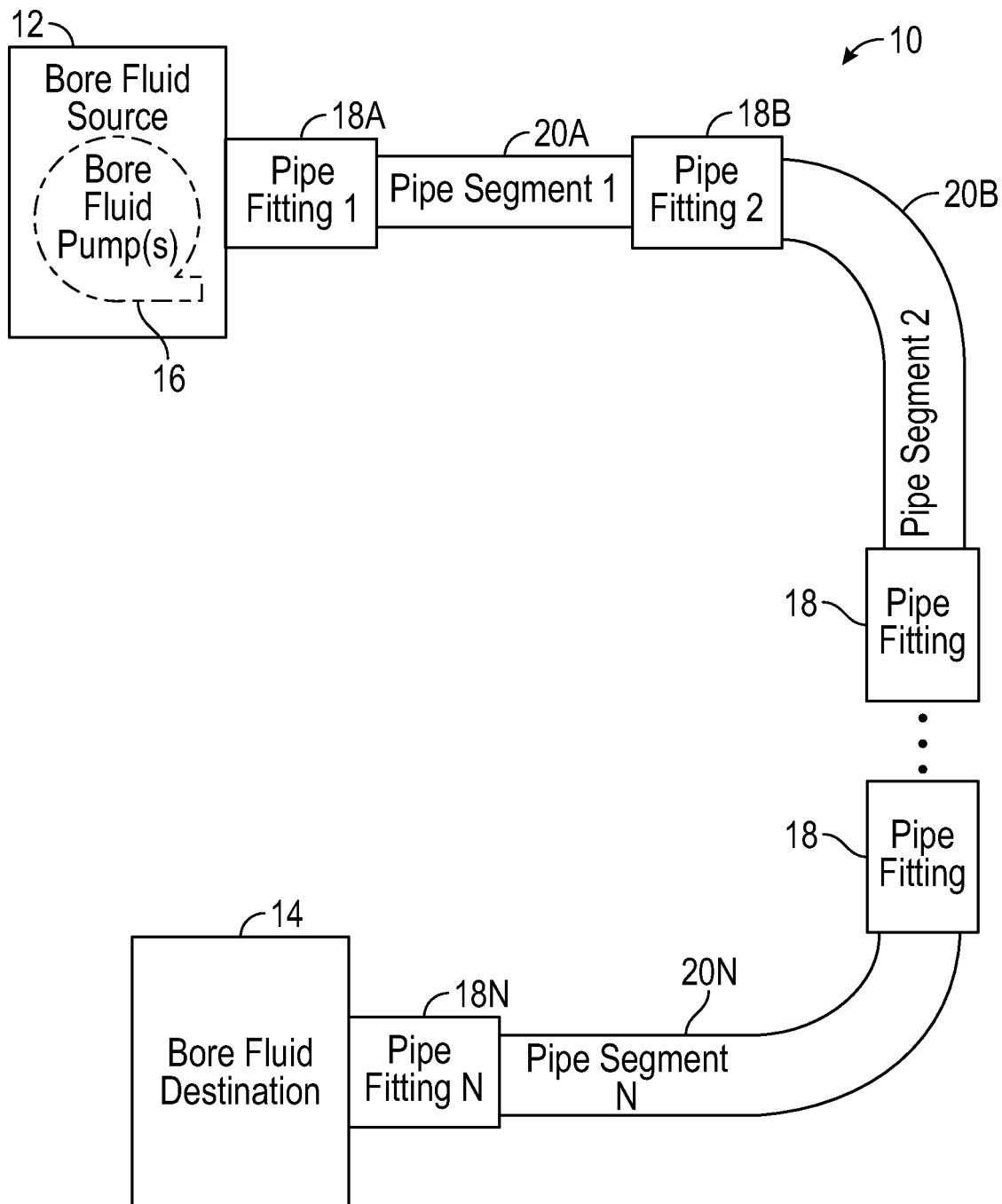
FIG. 1 is a block diagram of an example of a pipeline system including pipe segments and pipe fittings, in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items. Wherever possible, like or identical reference numerals are used in the figures to identify common or the same features. The figures are not necessarily to scale. In particular, certain features and/or certain views of the figures may be shown exaggerated in scale for purposes of clarification.

The present disclosure generally relates to pipeline systems that may be implemented and/or operated to transport (e.g., convey) fluid, such as liquid and/or gas, from a fluid source to a fluid destination. Generally, a pipeline system may include pipe fittings, such as a midline pipe fitting and/or a pipe end fitting, and one or more pipe segments. More specifically, a pipe segment may generally be secured and sealed in one or more pipe fittings to facilitate fluidly coupling the pipe segment to another pipeline component, such as another pipe segment, another pipe fitting, a fluid source, and/or a fluid destination. Merely as an illustrative non-limiting example, a pipeline system may include a first pipe end fitting secured to a first pipe segment to facilitate fluidly coupling the first pipe segment to the fluid source, a midline pipe fitting secured between the first pipe segment and a second pipe segment to facilitate fluidly coupling the first pipe segment to the second pipe segment, and a second pipe end fitting secured to the second pipe segment to facilitate fluidly coupling the second pipe segment to the fluid destination.

In any case, a pipe segment generally includes tubing that defines (e.g., encloses) a pipe bore, which provides a primary fluid conveyance (e.g., flow) path through the pipe segment. More specifically, the tubing of a pipe segment may be implemented to facilitate isolating environmental conditions external to the pipe segment from conditions within its pipe bore and, thus, fluid that flows therethrough. In particular, the tubing of a pipe segment may primarily be implemented to block fluid flow directly between the pipe bore of the pipe segment and its external environmental conditions, for example, in addition to providing thermal, pressure, and/or electrical isolation (e.g., insulation).

To facilitate improving fluid isolation, in some instances, the tubing of a pipe segment may be implemented with multiple tubing layers. For example, the tubing of a pipe segment may include an inner barrier (e.g., liner) layer and an outer barrier (e.g., shield and/or sheath) layer that are each implemented to run (e.g., span) the length of the pipe segment. In particular, the inner barrier layer and the outer barrier may each be implemented as a continuous layer of solid material, such as plastic, that runs the length of the pipe segment—although, at least in some instances, fluid may nevertheless gradually permeate through the inner barrier layer and/or the outer barrier layer.

In some instances, the tubing of a pipe segment may additionally include one or more intermediate layers implemented between its inner barrier layer and its outer barrier layer and, thus, in a tubing annulus of the pipe segment. In particular, to facilitate improving its tensile strength and/or its hoop strength, in some instances, the intermediate layers of pipe segment tubing may include one or more reinforcement (e.g., pressure armor and/or tensile armor) layers, which each has one or more solid (e.g., reinforcement) strips that are implemented with material that has a higher tensile strength and/or a higher linear elasticity modulus (e.g., stiffness) than material that is used to implement the inner barrier layer and/or the outer barrier layer of the pipe segment tubing. For example, a solid strip in a reinforcement layer may be implemented using metal, such as steel, while the inner barrier layer and the outer barrier layer of the pipe segment tubing are implemented using plastic, such as high-density polyethylene (HDPE).

Additionally, in some embodiments, an intermediate layer in the tubing of a pipe segment may be implemented to define free space (e.g., gaps and/or fluid conduits) within the tubing annulus of the pipe segment, for example, to facilitate improving flexibility of the pipe segment tubing. Merely as an illustrative non-limiting example, an intermediate (e.g., reinforcement) layer may be implemented in pipe segment tubing at least in part by helically wrapping a solid strip around the inner barrier layer of the pipe segment tubing such that free space is left between adjacent solid strip wraps. Another (e.g., intermediate or outer barrier) layer may then be implemented over the intermediate layer to cover the gaps, thereby defining a helically shaped gap within the anulus of the pipe segment tubing.

Nevertheless, in some instances, the tubing of a pipe segment may be damaged such that its integrity and, thus, its ability to provide isolation (e.g., insulation) between the pipe bore of the pipe segment and environmental conditions external to the pipe segment are affected (e.g., reduced). For example, a breach (e.g., hole or inadvertent opening) through the pipe segment tubing may result in excessive (e.g., undesired) fluid flow from the pipe segment directly out into environmental conditions external to the pipe segment and/or from the external environmental conditions directly into the pipe segment. In other words, at least in some instances, operating a pipeline system while a pipe segment deployed therein has a breach may affect (e.g., reduce) operational efficiency and/or operational reliability of the pipeline system, for example, due to the breach resulting in conveyed fluid being lost to and/or contaminated by external environmental conditions. Additionally, in some instances, a pipe segment may be damaged during operation of a pipeline and, thus, after initial installation of the pipe segment.

Accordingly, to facilitate improving pipeline operational efficiency and/or pipeline operational reliability, the present disclosure provides techniques for implementing and/or operating a monitoring apparatus in a pipeline system to facilitate detecting whether a breach is present in a pipe segment deployed in the pipeline system, for example, during operation of the pipeline system. As will be described in more detail below, to facilitate determining whether a breach is present in a pipe segment, a monitoring apparatus may generally include a control sub-system, which is implemented and/or operated to run (e.g., perform and/or execute) a bore monitoring algorithm (e.g., process) and an annulus monitoring algorithm (e.g., process). In particular, the bore monitoring algorithm may be executed to facilitate determining whether a breach is potentially present in a pipe segment based on one or more fluid parameters, such as fluid pressure and/or fluid flow rate, present within the pipe bore of the pipe segment while the annulus monitoring algorithm may be executed to facilitate determining whether a breach is potentially present in the pipe segment based on one or more fluid parameters, such as fluid pressure, fluid flow rate, fluid temperature, and/or fluid composition, present within the tubing annulus of the pipe segment.

Thus, to enable performance of an annulus monitoring algorithm, a monitoring apparatus may generally include one or more annulus sensors, which are each implemented to be fluidly connected to free space defined with the tubing annulus of a pipe segment and to determine sensor data indicative of one or more fluid parameters present in the tubing annulus of the pipe segment. Since tubing of a pipe segment is secured and sealed in a pipe fitting, in some embodiments, the pipe fitting may include an annulus vent port, which is implemented to be fluidly connected to the tubing annulus of the pipe segment, and an annulus sensor may be fluidly connected to the annulus vent port on the pipe fitting, for example, directly or via one or more external fluid conduits, such as a hose. Nevertheless, in some embodiments, one or more annulus sensors in a monitoring apparatus may additionally or alternatively be directly disposed directly within free space defined within the tubing annulus of a pipe segment.

In any case, to enable performance of a bore monitoring algorithm, a monitoring apparatus may generally include multiple bore sensors, which are each implemented to be fluidly connected to the pipe bore of a pipe segment and to determine sensor data indicative of one or more fluid parameters present within the pipe bore of the pipe segment. Since the pipe bore of a pipe segment is fluidly connected to the fitting bore of a pipe fitting, in some embodiments, the pipe fitting may include a bore monitoring port, which is fluidly connected to the fitting bore, and a bore sensor may be fluidly connected to the bore monitoring port, for example, directly or via one or more external fluid conduits, such as a hose. Nevertheless, in some embodiments, one or more bore sensors in a monitoring apparatus may additionally or alternatively be disposed directly within the pipe bore of a pipe segment and/or directly within the fitting bore of a pipe fitting.

Although a monitoring apparatus includes bore sensors and one or more annulus sensors, in some embodiments, the bore sensors or the one or more annulus sensors may be selectively turned off, for example, to save power. To enable the bore sensors or the one or more annulus sensors to be selectively turned off, in some embodiments, a control sub-system may execute a machine-learning algorithm (e.g., process) to learn one or more expected relationships between one or more bore fluid parameters indicated by sensor data determined by the bore sensors and one or more annulus fluid parameters indicated by sensor data determined by the one or more annulus sensors. After running for a sufficient duration, the bore sensors or the one or more annulus sensors may be turned off and the control sub-system may implement a virtual sensor in place of a turned-off sensor at least in part by determining a fluid parameter associated with the turned-off sensor based on a learned expected relationship between the fluid parameter and another fluid parameter associated with a turned-on sensor.

In any case, a bore monitoring algorithm may generally be premised on the sudden formation of a breach through the tubing of a pipe segment producing a negative pressure wave that propagates away from the breach within the pipe bore of the pipe segment. However, at least in some instances, sensor data indicative of bore fluid pressure may include noise, for example, which could inadvertently be interpreted as a pressure drop. Thus, instead of merely looking for a pressure drop, in some embodiments, a control sub-system executing a bore monitoring algorithm may determine whether a breach is potentially present in a pipe segment based on whether a bore pressure pattern, which is indicative of a breach, is detected in sensor data determined by one or more bore sensors, for example, after filtering the sensor data to remove at least a portion of noise therein.

In some embodiments, a breach bore pressure pattern used in a bore monitoring algorithm may be pre-determined. Nevertheless, as will be described in more detail below, in some embodiments, a breach bore pressure pattern may be adaptively (e.g., dynamically) adjusted, for example, via a machine-learning algorithm executed by a control sub-system. In fact, in some embodiments, different breach bore pressure patterns may be used during different execution cycles of a bore monitoring algorithm.

When a breach is potentially present in a pipe segment, to facilitate ameliorating (e.g., repairing and/or fixing) the breach, a control sub-system in a monitoring apparatus may additionally execute a bore monitoring algorithm to determine a potential location of the breach along the pipe segment. In particular, breach location determination provided by a bore monitoring algorithm may be premised on the propagation speed of a pressure wave through the pipe bore of a pipe segment varying with fluid flow rate through the pipe bore in a known manner. For example, the pressure wave may propagate downstream (e.g., with fluid flow) at a speed that is the bore fluid flow rate greater than the speed of sound. On the other hand, the pressure wave may propagate upstream (e.g., against fluid flow) at a speed that is the bore fluid flow rate less than the speed of sound.

Thus, to facilitate determining the speed with which a negative pressure wave produced by a breach in a pipe segment propagates to a bore sensor in a monitoring apparatus, a control sub-system in the monitoring apparatus may determine the flow rate of bore fluid within the pipe bore of the pipe segment, for example, based on sensor data determined by another bore sensor and/or operational status of a bore fluid pump. To facilitate determining a potential location of the breach, the control sub-system may additionally determine a time difference between when a breach bore pressure pattern is detected at different bore sensors. In this manner, the control sub-system may then determine the potential location of the breach relative to the bore sensors based on the time difference and the downstream propagation speed and/or the upstream propagation speed.

However, since premised on the sudden formation of a breach in a pipe segment producing a negative pressure wave, a bore monitoring algorithm may generally provide a single transient opportunity to detect the presence of the breach. Additionally, in some instances, a bore monitoring algorithm may inadvertently miss a breach in a pipe segment, for example, due to a breach bore pressure pattern being inappropriately set to account for actual noise. Moreover, in some instances, a bore monitoring algorithm may inadvertently detect a breach in a pipe segment when a breach is not actually present, for example, due to a breach bore pressure pattern being inappropriately set to account for actual noise.

Accordingly, to facilitate improving breach detection accuracy, in addition to a bore monitoring algorithm, a control sub-system in a monitoring apparatus may execute an annulus monitoring algorithm (e.g., process). Generally, an annulus monitoring algorithm may be premised on the inner barrier layer and the outer barrier layer of a pipe segment being implemented to provide fluid isolation and fluid gradually permeating through the inner barrier layer and/or the outer barrier layer at a predictable rate, for example, which is predictable based at least in part on a model, empirical testing, environmental conditions external to the pipe segment, fluid parameters of fluid input (e.g., supplied) to the pipe segment, implementation parameters, such as material and/or thickness, of the pipe segment tubing, or any combination thereof. Thus, when the pipe bore of a pipe segment is pressurized to produce fluid flow, in some embodiments, a control sub-system executing an annulus monitoring algorithm may determine that a breach is potentially present in the inner barrier layer of the pipe segment when sensor data determined by an annulus sensor is indicative of fluid pressure within the tubing annulus of the pipe segment exceeding an upper pressure threshold and/or fluid flow rate within the tubing annulus of the pipe segment exceeding an upper flow rate threshold. On the other hand, since environmental conditions external to a pipe segment are generally at a lower pressure, the control sub-system may determine that a breach is potentially present in the outer barrier layer of the pipe segment when sensor data determined by an annulus sensor is indicative of fluid pressure within the tubing annulus of the pipe segment dropping below a lower pressure threshold and/or fluid flow rate within the tubing annulus of the pipe segment dropping below a lower flow rate threshold.

Additionally, in some embodiments, a control sub-system executing an annulus monitoring algorithm may determine that a breach is potentially present in the outer barrier layer of a pipe segment when sensor data determined by an annulus sensor is indicative of the amount of external environment fluid within the tubing annulus of the pipe segment exceeding an environment fluid amount threshold, for example, which is set based at least in part on an expected permeation rate of external environment fluid through the outer barrier layer when a breach is not present therein. Similarly, in some embodiments, a control sub-system executing an annulus monitoring algorithm may determine that a breach is potentially present in the inner barrier layer of a pipe segment when sensor data determined by an annulus sensor is indicative of the amount of bore fluid within the tubing annulus of the pipe segment exceeding a bore fluid amount threshold, for example, which is set based at least in part on expected permeation rate of bore fluid through the inner barrier layer when a breach is not present therein. Furthermore, in some embodiments, a control sub-system executing an annulus monitoring algorithm may determine that a breach is potentially present in the inner barrier layer of a pipe segment when sensor data determined by an annulus sensor is indicative of fluid temperature within the tubing annulus of the pipe segment matching an expected bore fluid temperature, for example, within an error threshold that is set to facilitate accounting for measurement (e.g., sensor) error. Similarly, in some embodiments, a control sub-system executing an annulus monitoring algorithm may determine that a breach is potentially present in the outer barrier layer of a pipe segment when sensor data determined by an annulus sensor is indicative of fluid temperature within the tubing annulus of the pipe segment matching an expected temperature of external environment conditions, for example, within an error threshold that is set to facilitate accounting for measurement (e.g., sensor) error.

In any case, to facilitate improving breach detection accuracy, a control sub-system in a monitoring apparatus may then execute a cross-check algorithm (e.g., process) to cross-check (e.g., cross-correlate) an integrity state determined by a bore monitoring algorithm and an integrity state determined by an annulus monitoring algorithm and determine a cross-checked integrity state. For example, the control sub-system may determine the cross-checked integrity state to indicate that a breach is not present in a pipe segment when the bore monitoring integrity state and the annulus monitoring integrity state both indicate that a breach is not potentially present in the pipe segment. Similarly, the control sub-system may determine the cross-checked integrity state to indicate that a breach is present in a pipe segment when the bore monitoring integrity state and the annulus monitoring integrity state both indicate that a breach is potentially present in the pipe segment.

However, at least in some instances, an integrity state determined by executing a bore monitoring algorithm and an integrity state determined by executing an annulus monitoring algorithm may differ. In such instances, a control sub-system in a monitoring apparatus may generally defer to the annulus monitoring integrity state, for example, due to an annulus monitoring algorithm generally analyzing an annulus fluid parameter for changes that are more persistent and, thus, generally providing a larger breach detection window as compared to a corresponding bore monitoring algorithm. In other words, when a bore monitoring integrity state indicates that a breach is potentially present in a pipe segment, but a corresponding annulus monitoring integrity state indicates that a breach is not potentially present in the pipe segment, the control sub-system may determine a cross-checked integrity state to indicate that a breach is not actually present in the pipe segment. In other words, in such instances, the control sub-system may determine that execution of the bore monitoring algorithm resulted in a false positive and, thus, a pipeline system in which the pipe segment is deployed can continue actively flowing bore fluid through the pipe segment.

Nevertheless, to facilitate improving subsequent breach detection accuracy, in some embodiments, a bore monitoring algorithm may be adaptively (e.g., dynamically) adjusted. In particular, in some such embodiments, a breach bore pressure pattern used in the bore monitoring algorithm may be adaptively adjusted, for example, to exclude a breach bore pressure pattern that previously resulted in a false positive. In fact, as mentioned above, in some such embodiments, a breach bore pressure pattern used in a bore monitoring algorithm may be adaptively adjusted by executing a machine-learning algorithm, for example, using a control sub-system in a monitoring apparatus.

Furthermore, in some embodiments, when a bore monitoring integrity state indicates that a breach is not potentially present in a pipe segment, but a corresponding annulus monitoring integrity state indicates that a breach is potentially present in the pipe segment, a control system executing a cross-check algorithm may determine a cross-checked integrity state to indicate that a breach is actually present in the pipe segment. However, accuracy of breach location detection provided by an annulus monitoring algorithm is generally limited as compared to a bore monitoring algorithm. Accordingly, to facilitate determining a potential location of the breach, a breach bore pressure pattern used in the bore monitoring algorithm may be adaptively adjusted to enable the bore monitoring algorithm to detect the breach, for example, at least in part by executing a machine-learning algorithm via a control sub-system.

In particular, when a bore monitoring algorithm inadvertently misses a breach in a pipe segment, in some embodiments, the breach bore pressure pattern used in the bore monitoring algorithm may be adaptively adjusted at least in part by identifying a time when one or more annulus fluid parameters are initially indicative of a breach potentially being present in the pipe segment. Based on the time when the one or more annulus fluid parameters are initially indicative of a breach potentially being present in the pipe segment, profiles of one or more bore fluid parameters that occurred during a time period around the time may then be determined. The breach bore pressure pattern to be used in a subsequent execution cycle of the bore monitoring algorithm may then be set based at least in part on one or more bore pressure patterns that occurred in the one or more bore fluid parameter profiles.

In any case, a control sub-system in a monitoring apparatus may then indicate (e.g., present) the cross-checked integrity state to a user, such as an operator or a service technician, for example, at least in part by instructing an electronic display to display a graphical user interface (GUI) that provides a visual representation of the cross-checked integrity state. In particular, the control sub-system may indicate whether a breach is actually present in a pipe segment deployed in a pipeline system. Additionally, when a breach is present in the pipe segment, the control sub-system may indicate a potential location of the breach along the pipe segment and/or a tubing layer of the pipe segment that potentially includes the breach. In any case, in this manner, the present disclosure provides techniques for implementing and/or operating a monitoring apparatus in a pipeline system to facilitate improving breach detection accuracy, which, at least in some instances, may facilitate improving operational efficiency and/or operational reliability of the pipeline system.

To help illustrate, an example of a pipeline system 10 is shown in FIG. 1. As in the depicted example, the pipeline system 10 may be coupled between a bore fluid source 12 and a bore fluid destination 14. Merely as an illustrative non-limiting example, the bore fluid source 12 may be a production well and the bore fluid destination 14 may be a fluid storage tank. In other instances, the bore fluid source 12 may be a first (e.g., lease facility) storage tank and the bore fluid destination 14 may be a second (e.g., refinery) storage tank.

In any case, the pipeline system 10 may generally be implemented and/or operated to facilitate transporting (e.g., conveying) fluid, such as gas and/or liquid, from the bore fluid source 12 to the bore fluid destination 14. In fact, in some embodiments, the pipeline system 10 may be used in many applications, including without limitation, both onshore and offshore oil and gas applications. For example, in such embodiments, the pipeline system 10 may be used to transport one or more hydrocarbons, such as crude oil, petroleum, natural gas, or any combination thereof. Additionally or alternatively, the pipeline system 10 may be used to transport one or more other types of fluid, such as produced water, fresh water, fracturing fluid, flowback fluid, carbon dioxide, or any combination thereof.

To facilitate flowing fluid to the bore fluid destination 14, in some embodiments, the bore fluid source 12 may include one or more bore fluid pumps 16 that are implemented and/or operated to inject (e.g., pump and/or supply) fluid from the bore fluid source 12 into a bore of the pipeline system 10. However, it should be appreciated that the depicted example is merely intended to be illustrative and not limiting. In particular, in other embodiments, one or more bore fluid pumps 16 may not be implemented at the bore fluid source 12, for example, when fluid flow through the bore of the pipeline system 10 is produced by gravity. Additionally or alternatively, in other embodiments, one or more bore fluid pumps 16 may be implemented in the pipeline system 10 and/or at the bore fluid destination 14.

To facilitate transporting fluid from the bore fluid source 12 to the bore fluid destination 14, as in the depicted example, a pipeline system 10 may include one or more pipe fittings (e.g., connectors) 18 and one or more pipe segments 20. For example, the depicted pipeline system 10 includes a first pipe segment 20A, a second pipe segment 20B, and an Nth pipe segment 20N. Additionally, the depicted pipeline system 10 includes a first pipe (e.g., end) fitting 18A, which couples the bore fluid source 12 to the first pipe segment 20A, a second pipe (e.g., midline) fitting 18B, which couples the first pipe segment 20A to the second pipe segment 20B, and an Nth pipe (e.g., end) fitting 18N, which couples the Nth pipe segment 20N to the bore fluid destination 14.

However, it should again be appreciated that the depicted example is merely intended to be illustrative and not limiting. In particular, in other embodiments, a pipeline system 10 may include fewer than three (e.g., two or one) pipe segments 20 or more than three (e.g., four, five, or more) pipe segments 20. Additionally or alternatively, in other embodiments, a pipeline system 10 may include fewer than four (e.g., three or two) pipe fittings 18 or more than four (e.g., five, six, or more) pipe fittings 18.

In any case, as described above, a pipe segment 20 generally includes tubing that may be used to convey (e.g., transfer and/or transport) water, gas, oil, and/or any other suitable type of fluid. The tubing of a pipe segment 20 may be made of any suitable type of material, such as plastic, metal, and/or a composite (e.g., fiber-reinforced composite) material. In fact, as will be described in more detail below, in some embodiments, the tubing of a pipe segment 20 may be implemented using multiple different tubing layers. For example, the tubing of a pipe segment 20 may include a first high-density polyethylene (e.g., internal corrosion protection) layer, one or more reinforcement (e.g., steel strip) layers external to the first high-density polyethylene layer, and a second high-density polyethylene (e.g., external corrosion protection) layer external to the one or more reinforcement layers.

Additionally, as in the depicted example, one or more (e.g., second and/or Nth) pipe segments 20 in a pipeline system 10 may be curved. To facilitate implementing a curve in a pipe segment 20, in some embodiments, the pipe segment 20 may be flexible, for example, such that the pipe segment 20 is spoolable on a reel and/or in a coil (e.g., during transport and/or before deployment of the pipe segment 20). In other words, in some embodiments, one or more pipe segments 20 in the pipeline system 10 may be a flexible pipe, such as a bonded flexible pipe, an unbonded flexible pipe, a flexible composite pipe (FCP), a thermoplastic composite pipe (TCP), or a reinforced thermoplastic pipe (RTP). In fact, at least in some instances, increasing flexibility of a pipe segment 20 may facilitate improving deployment efficiency of a pipeline system 10, for example, by obviating a curved (e.g., elbow) pipe fitting 18 and/or enabling the pipe segment 20 to be transported to the pipeline system 10, deployed in the pipeline system 10, or both using a tighter spool.

To facilitate improving pipe flexibility, in some embodiments, the tubing of a pipe segment 20 that defines (e.g., encloses) its pipe bore may additionally define free space (e.g., one or more gaps) devoid of solid material in its annulus. In fact, in some embodiments, the free space in the tubing annulus of a pipe segment 20 may run (e.g., span) the length of the pipe segment 20 and, thus, define (e.g., enclose) one or more fluid conduits in the annulus of the tubing, which are separate from the pipe bore. In other words, in such embodiments, fluid may flow through a pipe segment 20 via its pipe bore, a fluid conduit defined within its tubing annulus, or both.

Figure 2:
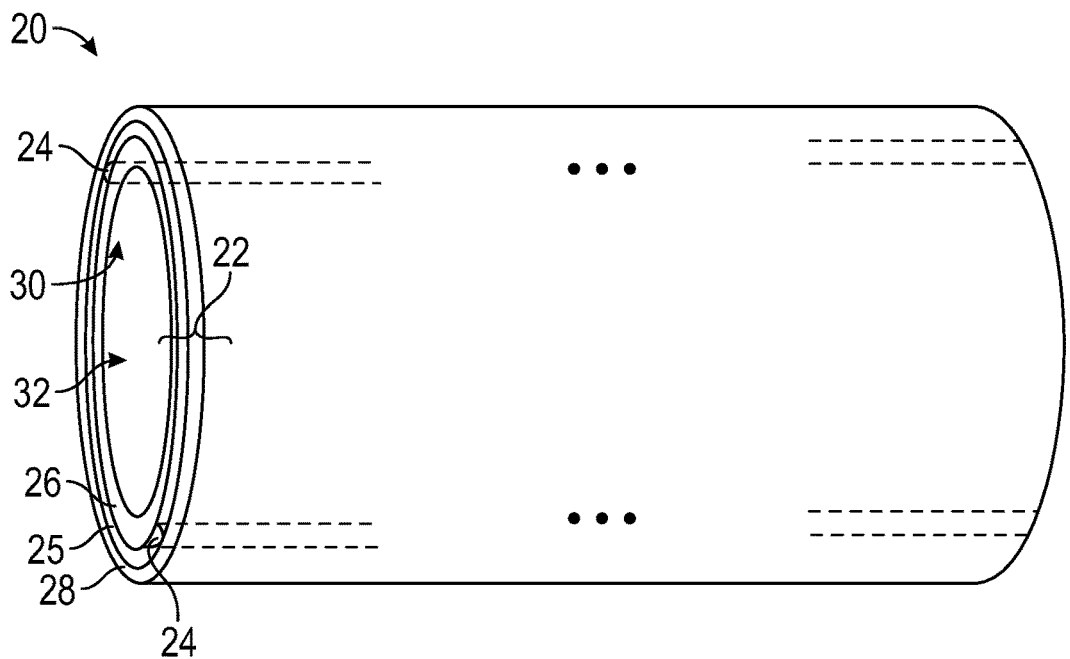
FIG. 2 is a side view of an example of a pipe segment of FIG. 1 that includes a pipe bore defined by its tubing as well as fluid conduits implemented within an annulus of its tubing, in accordance with an embodiment of the present disclosure.

To help illustrate, an example of a pipe segment 20, which includes tubing 22 with fluid conduits (e.g., free space) 24 implemented in its annulus 25, is shown in FIG. 2. As depicted, the pipe segment tubing 22 is implemented with multiple tubing layers including an inner barrier (e.g., liner) layer 26 and an outer barrier (e.g., shield and/or sheath) layer 28. In some embodiments, the inner barrier layer 26 and/or the outer barrier layer 28 of the pipe segment tubing 22 may be implemented using composite material and/or plastic, such as high-density polyethylene (HDPE) and/or raised temperature polyethylene (PE-RT). Although a number of particular layers are depicted, it should be understood that the techniques described in the present disclosure may be broadly applicable to composite pipe body structures including two or more layers, for example, as distinguished from a rubber or plastic single-layer hose subject to vulcanization. In any case, as depicted, an inner surface 30 of the inner barrier layer 26 defines (e.g., encloses) a pipe bore 32 through which fluid can flow, for example, to facilitate transporting fluid from a bore fluid source 12 to a bore fluid destination 14.

Additionally, as depicted, the tubing annulus 25 of the pipe segment 20 is implemented between its inner barrier layer 26 and its outer barrier layer 28. As will be described in more detail below, the tubing annulus 25 of a pipe segment 20 may include one or more intermediate layers. Furthermore, as depicted, fluid conduits 24 running along the length of the pipe segment 20 are defined (e.g., enclosed) in the tubing annulus 25. As described above, a fluid conduit 24 in the tubing annulus 25 may be devoid of solid material. As such, pipe segment tubing 22 that includes one or more fluid conduits 24 defined therein may include less solid material and, thus, exert less resistance to flexure, for example, compared to solid pipe segment tubing 22 and/or pipe segment tubing 22 that does not include fluid conduits 24 defined its annulus 25. Moreover, to facilitate further improving pipe flexibility, in some embodiments, one or more layers in the tubing 22 of a pipe segment 20 may be unbonded from one or more other layers in the tubing 22 and, thus, the pipe segment 20 may be an unbonded pipe.

However, it should be appreciated that the depicted example is merely intended to be illustrative and not limiting. In particular, in other embodiments, a pipe segment 20 may include fewer than two (e.g., one) or more than two (e.g., three, four, or more) fluid conduits 24 defined in its tubing annulus 25. Additionally or alternatively, in other embodiments, a fluid conduit 24 defined in the tubing annulus 25 of a pipe segment 20 may run non-parallel to the pipe bore 32 of the pipe segment 20, for example, such that the fluid conduit 24 is skewed relative to the longitudinal extent of the pipe bore 32.

Figure 3:
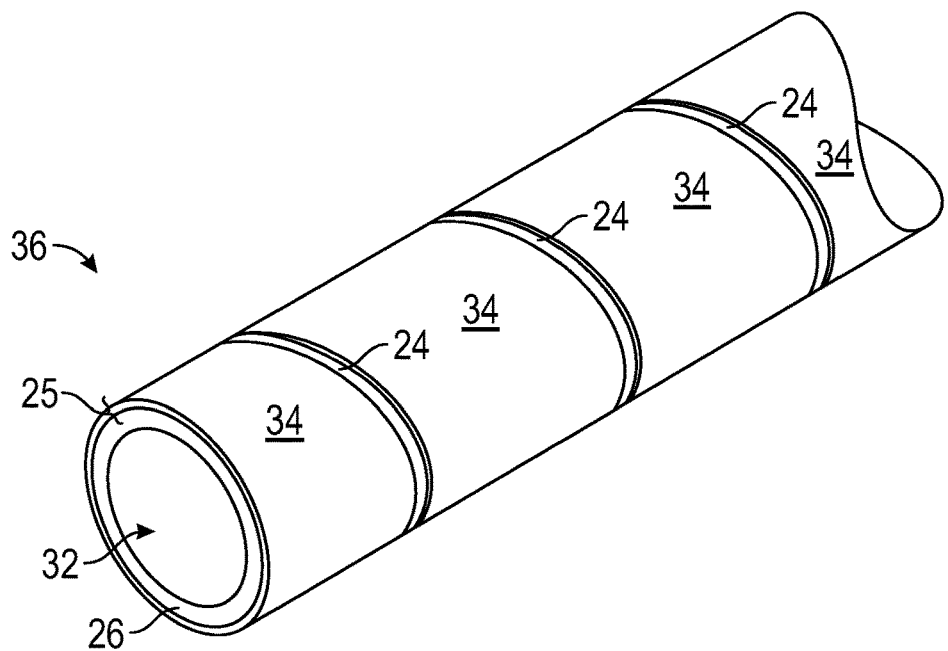
FIG. 3 is an example of a portion of the pipe segment of FIG. 2 with a helically shaped fluid conduit implemented within the annulus of its tubing, in accordance with an embodiment of the present disclosure.

To help illustrate, an example of a portion 36 of a pipe segment 20, which includes an inner barrier layer 26 and an intermediate layer 34 included in the annulus 25 of its pipe segment tubing 22, is shown in FIG. 3. In some embodiments, one or more intermediate layers 34 of the pipe segment tubing 22 may be implemented at least in part using composite material and/or metal, such as carbon steel, stainless steel, duplex stainless steel, super duplex stainless steel, or any combination thereof. In other words, at least in some such embodiments, the intermediate layer 34 of the pipe segment tubing 22 may be implemented using electrically conductive, which, at least in some instances, may enable communication of electrical (e.g., control and/or sensor) signals via the intermediate layer 34.

In any case, as depicted, the intermediate layer 34 is helically disposed (e.g., wound and/or wrapped) on the inner barrier layer 26 such that free space is left between adjacent windings to define a fluid conduit 24. In other words, in some embodiments, the intermediate layer 34 may be implemented at least in part by winding a metal (e.g., steel) strip around the inner barrier layer 26 at a non-zero lay angle (e.g., fifty-four degrees) relative to the longitudinal extent of the pipe bore 32. In any case, as depicted, the resulting fluid conduit 24 runs helically along the pipe segment 20, for example, such that the fluid conduit 24 is skewed fifty-four degrees relative to the axial extent of the pipe bore 32.

In some embodiments, an outer barrier layer 28 may be disposed directly over the depicted intermediate layer 34 and, thus, cover and/or define (e.g., enclose) the depicted fluid conduit 24. However, in other embodiments, the tubing annulus 25 of pipe segment tubing 22 may include multiple (e.g., two, three, four, or more) intermediate layers 34. In other words, in such embodiments, one or more other intermediate layers 34 may be disposed over the depicted intermediate layer 34. In fact, in some such embodiments, the one or more other intermediate layers 34 may also each be helically disposed such that gaps are left between adjacent windings to implement one or more corresponding fluid conduits 24 in the pipe segment tubing 22.

For example, a first other intermediate layer 34 may be helically disposed on the depicted intermediate layer 34 using the same non-zero lay angle as the depicted intermediate layer 34 to cover (e.g., define and/or enclose) the depicted fluid conduit 24 and to implement another fluid conduit 24 in the first other intermediate layer 34. Additionally, a second other intermediate layer 34 may be helically disposed on the first other intermediate layer 34 using another non-zero lay angle, which is the inverse of the non-zero lay angle of the depicted intermediate layer 34, to implement another fluid conduit 24 in the second other intermediate layer 34. Furthermore, a third other intermediate layer 34 may be helically disposed on the second other intermediate layer 34 using the same non-zero lay angle as the second other intermediate layer 34 to cover the other fluid conduit 24 in the second other intermediate layer 34 and to implement another fluid conduit 24 in the third other intermediate layer 34. In some embodiments, an outer barrier layer 28 may be disposed over the third other intermediate layer 34 and, thus, cover (e.g., define and/or enclose) the other fluid conduit 24 in the third other intermediate layer 34.

Although implemented with multiple tubing layers, in some instances, the tubing of a pipe segment 20 may nevertheless be damaged such that its integrity and, thus, its ability to provide isolation (e.g., insulation) between the pipe bore 32 of the pipe segment 20 and environmental conditions external to the pipe segment 20 are affected (e.g., reduced). For example, a breach (e.g., hole or inadvertent opening) in the pipe segment tubing 22 may result in excessive (e.g., undesired) fluid flow from the pipe segment 20 directly out into environmental conditions external to the pipe segment 20 and/or from the external environmental conditions directly into the pipe segment 20. In other words, at least in some instances, operating a pipeline system 10 while a pipe segment 20 deployed therein has a breach may affect (e.g., reduce) operational efficiency and/or operational reliability of the pipeline system 10, for example, due to the breach resulting in conveyed fluid being lost to and/or contaminated by external environmental conditions. Additionally, in some instances, a pipe segment 20 may be damaged during operation of a pipeline 10 and, thus, after initial installation of the pipe segment 20. Accordingly, to facilitate improving pipeline operational efficiency and/or pipeline operational reliability, the present disclosure provides techniques for implementing and/or operating a monitoring apparatus in a pipeline system 10 to facilitate determining whether a breach is present in a pipe segment 20 deployed in the pipeline system 10, for example, during operation of the pipeline system 10.

Figure 4:
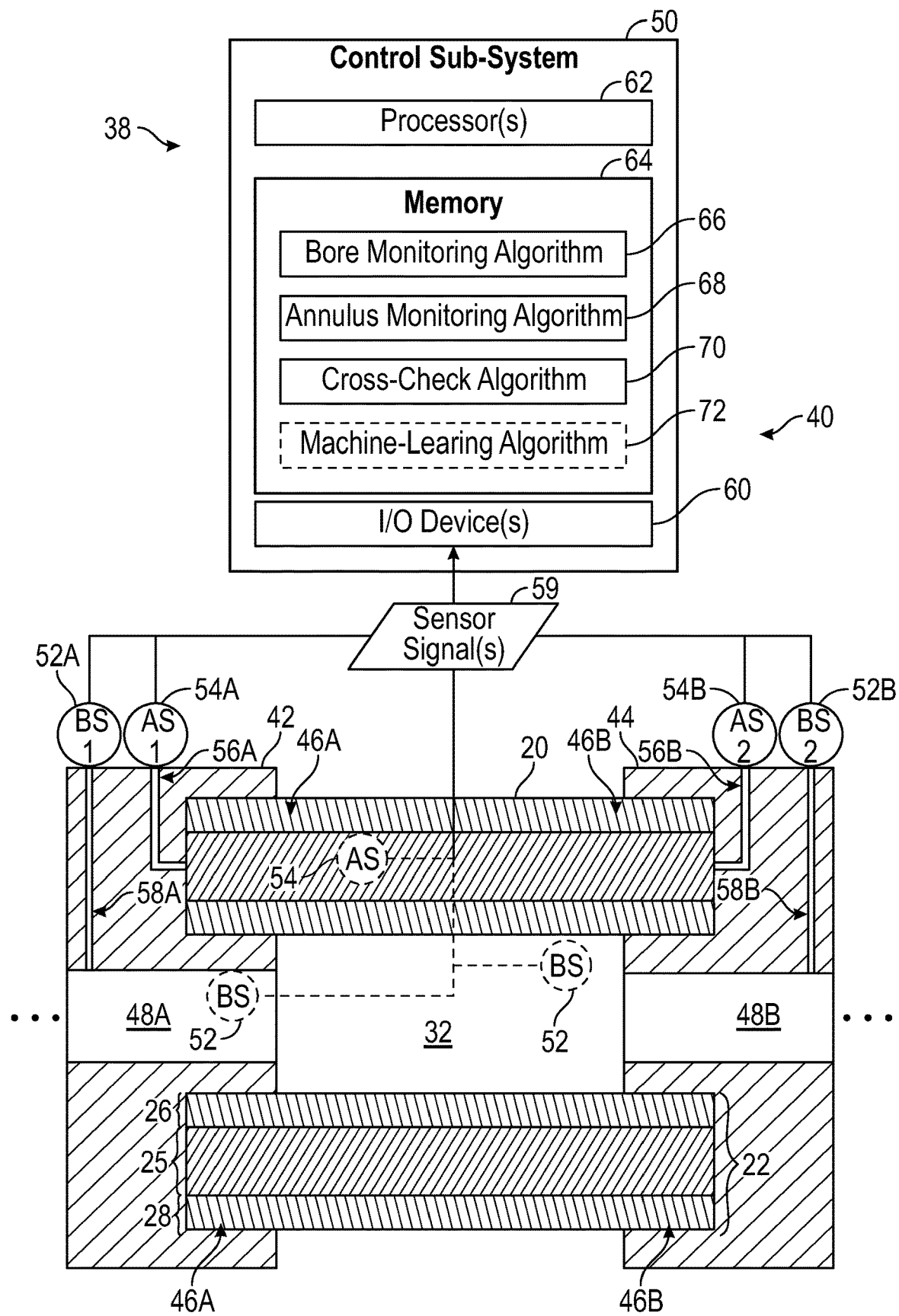
FIG. 4 is a cross-sectional view of a portion of a pipeline system and an example of a monitoring apparatus, in accordance with an embodiment of the present disclosure.

To help illustrate, a portion 38 of a pipeline system 10 and an example of a monitoring apparatus 40 are shown in FIG. 4. As depicted, the portion 38 of the pipeline system 10 includes pipe fitting 18—namely an upstream (e.g., first) pipe fitting 42 and a downstream (e.g., second) pipe fitting 44, as well as a pipe segment 20. In particular, as depicted, a first end of the tubing 22 of the pipe segment 20 is secured and sealed in a first tubing cavity 46A of the upstream pipe fitting 42 such that the pipe bore 32 of the pipe segment 20 is fluidly connected to an upstream fitting bore 48A of the upstream pipe fitting 42. Similarly, as depicted, a second end of the pipe segment tubing 22 is secured and sealed in a second tubing cavity 46B of the downstream pipe fitting 44 such that the pipe bore 32 of the pipe segment 20 is fluidly connected to a downstream fitting bore 48B of the downstream pipe fitting 44.

Additionally, as in the depicted example, a monitoring apparatus 40 in a pipeline system 10 may generally include a control sub-system 50, multiple bore sensors 52, and one or more annulus sensors 54. In particular, each bore sensor 52 in a monitoring apparatus 40 may be implemented and/or operated to determine time-stamped sensor data indicative of one or more fluid parameters present within the pipe bore 32 of a pipe segment 20 at various times. For example, the bore sensors 52 may include pressure sensors that determine sensor data indicative of fluid pressure within the pipe bore 32 of the pipe segment 20. Additionally, the bore sensors 52 may include one or more flow meters that determine sensor data indicative of the flow rate of bore fluid within the pipe bore 32 of the pipe segment 20.

On the other hand, each annulus sensor 54 in a monitoring apparatus 40 may be implemented and/or operated to determine time-stamped sensor data indicative of one or more fluid parameters present within the tubing annulus 25 of a pipe segment 20 at various times. For example, the one or more annulus sensors 54 may include a pressure sensor that determines sensor data indicative of fluid pressure within the tubing annulus 25 of the pipe segment 20. Additionally, the one or more annulus sensors 54 may include a flow meter that determines sensor data indicative of fluid flow rate within the tubing annulus 25 of the pipe segment 20. Furthermore, the one or more annulus sensor 54 include a temperature sensor that determines sensor data indicative of fluid temperature within the tubing annulus 25 of the pipe segment 20. Moreover, the one or more annulus sensors 54 may include a fluid composition sensor that determines sensor data indicative of the amount (e.g., percentage and/or concentration) of one or more fluid components present within the tubing annulus 25 of the pipe segment 20.

In any case, to enable an annulus sensor 54 to determine sensor data indicative of one or more fluid parameters within the tubing annulus 25 of a pipe segment 20, the annulus sensor 54 may be fluidly connected to free space (e.g., one or more fluid conduits 24) defined within the tubing annulus 25. As in the depicted example, since the tubing 22 of the pipe segment 20 is secured and sealed in the upstream pipe fitting 42 and in the downstream pipe fitting 44, in some embodiments, an annulus vent port 56 may be formed in one or more of the pipe fittings 18 such that the annulus vent port 56 opens to a corresponding tubing cavity 46 and an annulus sensor 54 may be fluidly connected to each annulus vent port 56. In particular, in the depicted example, the upstream pipe fitting 42 includes a first annulus vent port 56A and a first annulus sensor 54A is connected to the first annulus vent port 56A. Additionally, in the depicted example, the downstream pipe fitting 44 includes a second annulus vent port 56B and a second annulus sensor 54B is connected to the second annulus vent port 56B.

However, it should be appreciated that the depicted example is merely intended to be illustrative and not limiting. In other particular, in other embodiments, a monitoring apparatus 40 may include a single annulus sensor 54. Additionally, in other embodiments, an annulus sensor 54 may be fluidly connected to a corresponding annulus vent port 56 via one or more external fluid conduits, such as a hose. Furthermore, in other embodiments, a monitoring apparatus 40 may additionally or alternatively include one or more annulus sensors 54 disposed directly within the tubing annulus 25 of a pipe segment 20. Moreover although a single pipe segment 20 is depicted, in other embodiments, multiple pipe segments 20 may be connected between an upstream pipe fitting 42 and a downstream pipe fitting 44, for example, via one or more midline pipe fittings 18. In fact, in some embodiments, one or more annulus sensors 52 and/or one or more bore sensors 52 in a monitoring apparatus may be deployed at a midline pipe fitting 18 and/or a pipe end fitting 18.

In any case, to enable a bore sensor 52 to determine sensor data indicative of one or more fluid parameters present within the pipe bore 32 of a pipe segment 20, the bore sensor 52 may be fluidly connected to the pipe bore 32 of the pipe segment 20. As in the depicted example, since the pipe bore 32 of the pipe segment 20 is connected to the fitting bores 48 of the upstream pipe fitting 42 and the downstream pipe fitting 44, in some embodiments, a bore monitoring port 58 may be formed in each of the pipe fittings 18 such that the bore monitoring port 58 opens to a corresponding fitting bore 48 and a bore sensor 52 may be fluidly connected to each bore monitoring port 58. In particular, in the depicted example, the upstream pipe fitting 42 includes a first bore monitoring port 58A and a first bore sensor 52A is connected to the first bore monitoring port 58A. Additionally, in the depicted example, the downstream pipe fitting 44 includes a second bore monitoring port 58B and a second bore sensor 52B is connected to the second bore monitoring port 58B.

However, it should again be appreciated that the depicted example is merely intended to be illustrative and not limiting. In particular, in other embodiments, a monitoring apparatus 40 may additionally or alternatively include one or more bore sensors 52 disposed directly within the pipe bore 32 of a pipe segment 20. Furthermore, in other embodiments, a monitoring apparatus 40 may additionally or alternatively include one or more bore sensors 52 disposed directly within the fitting bore 48 of a pipe fitting 18.

In any case, sensor data determined by bore sensors 52 and one or more annulus sensors 54 in a monitoring apparatus 40 may be communicated to a control sub-system 50 in the monitoring apparatus 40 for processing via one or more sensor signals 59. In particular, in some embodiments, a fluid parameter sensor in the monitoring apparatus 40 may be implemented and/or operated to communicate one or more sensor signals 59 to the control sub-system 50 via a wireless connection. Nevertheless, in other embodiments, a fluid parameter sensor in the monitoring apparatus 40 may be implemented and/or operated to communicate one or more sensor signals 59 to the control sub-system 50 via a wired connection.

In any case, to enable communication outside of a control sub-system 50, as in the depicted example, the control sub-system 50 may generally include one or more I/O devices 60. In particular, to enable communication with fluid parameter sensors, the I/O devices 60 of the control sub-system 50 may include one or more input/output (I/O) ports (e.g., terminals). Additionally, to facilitate communicating an integrity state of a pipe segment 20 to a user (e.g., operator), in some embodiments, the I/O devices 60 of a control sub-system 50 may include one or more user output devices, such as an electronic display, which is implemented and/or operated to display a graphical user interface (GUI) that provides a visual representation of the integrity state (e.g., whether a breach is present in the pipe segment 20). Furthermore, to enable user interaction with a control sub-system 50, the I/O devices 60 of the control sub-system 50 may include one or more user input devices, such as a hard button, a soft button, a keyboard, a mouse, and/or the like.

To facilitate processing sensor data, as in the depicted example, a control sub-system 50 in a monitoring apparatus 40 may generally include one or more processors 62 and memory 64. In particular, in some embodiments, the memory 64 in a control sub-system 50 may include one or more tangible, non-transitory, computer-readable media that are implemented and/or operated to store data and/or executable instructions. For example, the memory 64 may store sensor data based at least in part on one or more sensor signals 59 received from a fluid parameter sensor. Additionally, as depicted, the memory 64 may store a bore monitoring algorithm 66, an annulus monitoring algorithm 68, and a cross-check algorithm 70, for example, in addition to a machine-learning algorithm 72. As such, in some embodiments, the memory 64 may include volatile memory, such as random-access memory (RAM), and/or non-volatile memory, such as read-only memory (ROM), flash memory, a solid-state drive (SSD), a hard disk drive (HDD), or any combination thereof.

Additionally, in some embodiments, a processor 62 in a control sub-system 50 may include processing circuitry that is implemented and/or operated to process data and/or execute instructions stored in memory 64. In other words, in some such embodiments, a processor 62 in a control sub-system 50 may include one or more general purpose microprocessors, one or more application specific integrated circuits (ASICs), one or more field programmable gate arrays (FPGAs), or any combination thereof. For example, a processor 62 in the control sub-system 50 may execute instructions stored in memory 64 to determine a control signal that instructs a fluid parameter sensor to return a sensor signal 59 indicative of one or more fluid parameters, such as fluid temperature, fluid flow rate, fluid composition, and/or fluid temperature, to the control sub-system 50.

Furthermore, a processor 62 in a control sub-system 50 may process sensor data in accordance with one or more sets of instructions (e.g., algorithms) stored in memory 64. In particular, as will be described in more detail below, to facilitate determining whether a breach is present in a pipe segment 20, the control sub-system 50 may execute an annulus monitoring algorithm 68 based on sensor data indicative of one or more fluid parameters present within the tubing annulus 25 of the pipe segment 20. Additionally, the control sub-system 50 may execute a bore monitoring algorithm 66 based on sensor data indicative of one or more fluid parameters present within the pipe bore 32 of a pipe segment 20 to facilitate determining whether a breach is present in the pipe segment 20 and, when a breach is present, a potential location of the breach along the pipe segment 20.

Figure 5:
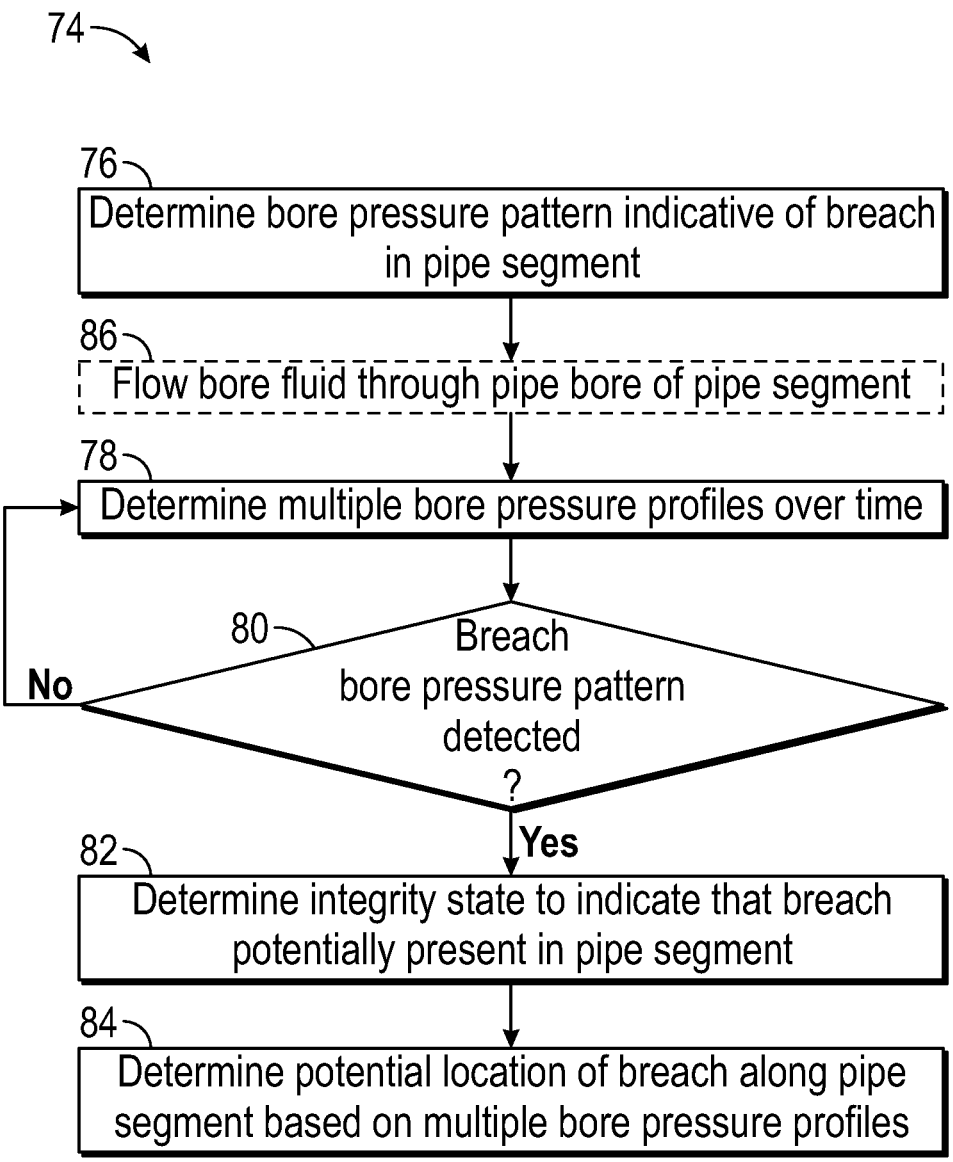
FIG. 5 is a flow diagram of an example of a bore monitoring process, in accordance with an embodiment of the present disclosure.

To help illustrate, an example of a bore monitoring process 74 is described in FIG. 5. Generally, the bore monitoring process 74 includes determining a bore pressure pattern indicative of a breach in a pipe segment (process block 76), determining multiple bore pressure profiles over time (process block 78), and determining whether the breach bore pressure pattern is detected (decision block 80). Additionally, when the breach bore pressure pattern is detected, the bore monitoring process 74 generally includes determining an integrity state to indicate that a breach is potentially present in the pipe segment (process block 82) and determining a potential location of the breach along the pipe segment (process block 84).

Although specific blocks are described in a specific order, which corresponds with an embodiment of the present disclosure, it should be appreciated that the example bore monitoring process 74 is merely intended to be illustrative and non-limiting. In particular, in other embodiments, a bore monitoring process 74 may include one or more additional blocks and/or omit one or more of the depicted blocks. For example, some embodiments of a bore monitoring process 74 may additionally include flowing bore fluid through a pipe bore of the pipe segment (process block 86) while other embodiments of a bore monitoring process 74 do not. Additionally, in other embodiments, one or more of the depicted blocks may be performed in a different order, for example, such that the breach bore pressure pattern is determined after determining one or more bore pressure profiles. Moreover, in some embodiments, a bore monitoring process 74 may be performed at least in part by executing instructions, such as a bore monitoring algorithm 66, stored in tangible, non-transitory, computer-readable media, such as memory 64 of a control sub-system 50, using processing circuitry, such as one or more processors 62 of the control sub-system 50.

For example, in such embodiments, a control sub-system 50 in a monitoring apparatus 40, which is deployed in a pipeline system 10, may determine one or more bore pressure patterns, which are expected to be indicative of a breach being present in a pipe segment 20 deployed in the pipeline system 10 (process block 76). In particular, in some embodiments, a breach bore pressure pattern used in a bore monitoring algorithm 66 may be pre-determined and stored in memory 64 of the control sub-system 50. Nevertheless, as will be described in more detail below, in some embodiments, a breach bore pressure pattern may be adaptively (e.g., dynamically) adjusted, for example, via a machine-learning algorithm 72 executed by the control sub-system 50 and/or between different execution cycles of the bore monitoring algorithm 66.

In any case, as described above, at least in some instances, damage (e.g., one or more breaches) that affects the ability of a pipe segment 20 to provide fluid isolation may form after initial deployment of the pipe segment 20 in a pipeline system 10, for example, during operation of the pipeline system 10. Thus, in some embodiments, a bore monitoring algorithm 66 may be executed while bore fluid is being actively flowed (e.g., pumped) through the pipe bore 32 of the pipe segment 20 (process block 86). In particular, to facilitate actively flowing bore fluid through the pipe bore 32 of a pipe segment 20, in some embodiments, a control sub-system 50 in the pipeline system 10 may instruct a bore fluid pump 16, which is fluidly connected to the pipe bore 32, to inject (e.g., supply) bore fluid into the pipe bore 32, for example, via one or more control signals. Nevertheless, in other embodiments, a bore monitoring algorithm 66 may be executed while bore fluid is not being actively flowed through the pipe bore 32 of a pipe segment 20 being monitored.

To facilitate detecting the presence and/or a potential location of a breach in a pipe segment 20, as described above, a control sub-system 50 in a monitoring apparatus 40 may additionally determine multiple bore pressure profiles (e.g., trajectories) over time (process block 78). In particular, based on corresponding time-stamped sensor data, the control sub-system 50 may determine a bore pressure profile for each of multiple fluid pressure bore sensors 52 in the monitoring apparatus 40. For example, the control sub-system 50 may determine a first bore pressure profile associated with a first bore sensor 52A based on first sensor data indicative of bore fluid pressure at the first bore sensor 52A. Similarly, the control sub-system 50 may determine a second bore pressure profile associated with a second bore sensor 52B based on second sensor data indicative of bore fluid pressure at the second bore sensor 52B.

To facilitate determining whether a breach is potentially present in the pipe segment 20, the control sub-system 50 may then determine whether a breach bore pressure pattern is detected in one or more of the bore pressure profiles (decision block 80). In particular, the control sub-system 50 may determine a bore monitoring integrity state to indicate that a breach is not potentially present in the pipe segment 20 when the breach bore pressure pattern is not detected in any of the bore pressure profiles. On the other hand, the control sub-system 50 may determine a bore monitoring integrity state to indicate that a breach is potentially present in the pipe segment 20 when the breach bore pressure pattern is detected in one or more of the bore pressure profiles (process block 82). In some embodiments, the bore monitoring integrity state may be stored in memory 64 of the control sub-system 50 to enable subsequent retrieval. When a breach is potentially present, to facilitate ameliorating the breach, the control sub-system 50 may additionally determine a potential location of the breach along the pipe segment 20 based at least in part on the multiple bore pressure profiles (process block 84).

Figure 6:
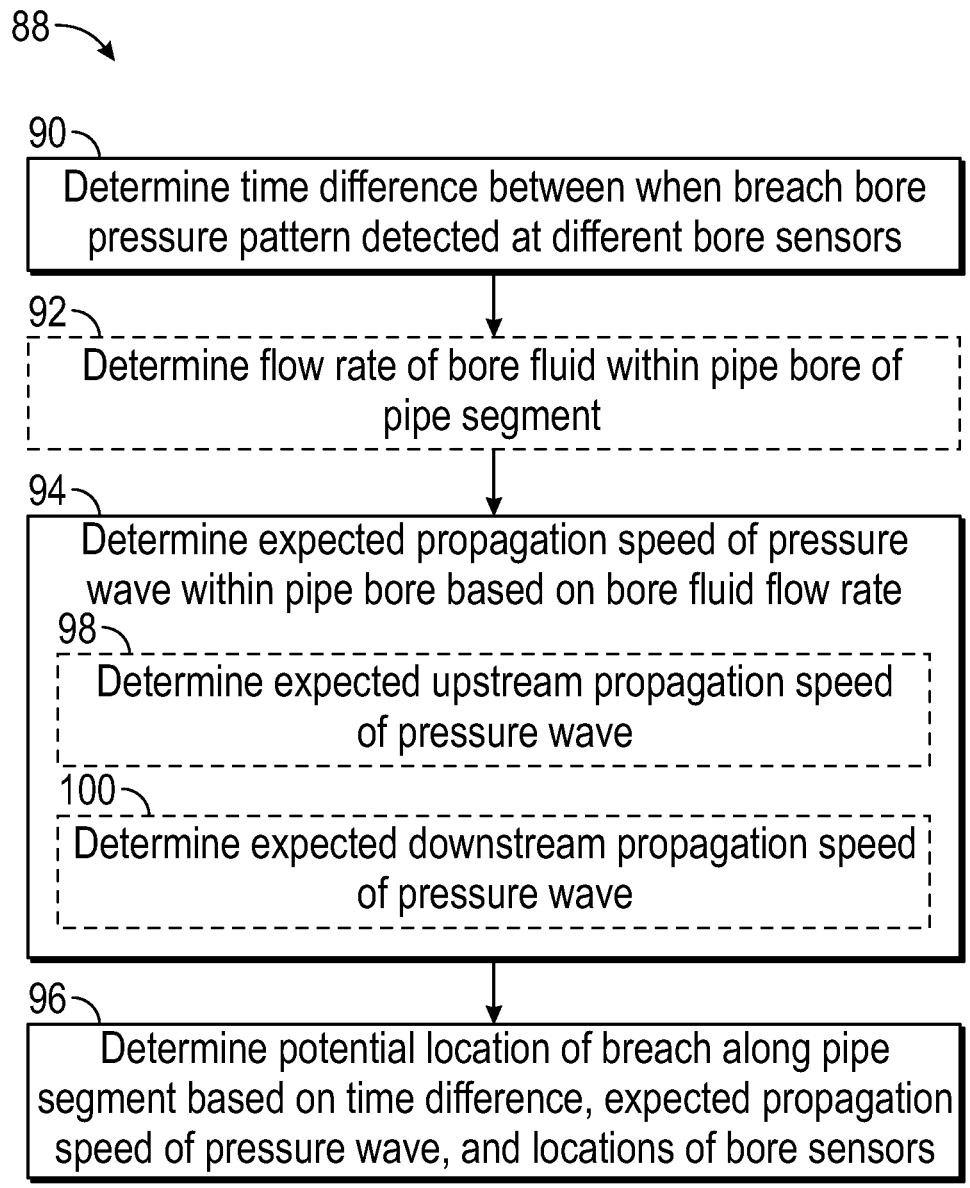
FIG. 6 is a flow diagram of an example of a process for determining a potential location of a breach along a pipe segment, in accordance with an embodiment of the present disclosure.

To help illustrate, an example of a process 88 for determining a potential location of a breach along a pipe segment 20 is described in FIG. 6. Generally, the process 88 includes determining a time difference between when a breach bore pressure pattern is detected at different bore sensors (process block 90). Additionally, the process 88 generally includes determining an expected propagation speed of a pressure wave within a pipe bore of the pipe segment based on the bore fluid flow rate (process block 94) and determining a potential location of a breach along the pipe segment based on the time difference, the expected propagation speed of the pressure wave, and locations of the bore sensors (process block 96).

Although specific blocks are described in a specific order, which corresponds with an embodiment of the present disclosure, it should be appreciated that the example process 88 is merely intended to be illustrative and non-limiting. In particular, in other embodiments, a process 88 for determining a potential location of a breach along a pipe segment 20 may include one or more additional blocks and/or omit one or more of the depicted blocks. For example, some embodiments of the process 88 may include determining a flow rate of bore fluid within a pipe bore of the pipe segment (process block 92) while other embodiments of the process do not. Additionally, in other embodiments, one or more of the depicted blocks may be performed in a different order, for example, such that the flow rate of bore fluid within the pipe bore of the pipe segment is determined before determining the time difference between when the breach bore pressure pattern is detected at different bore sensors. Moreover, in some embodiments, a process 88 for determining a potential location of a breach along a pipe segment 20 may be performed at least in part by executing instructions, such as a bore monitoring algorithm 66, stored in tangible, non-transitory, computer-readable media, such as memory 64 of a control sub-system 50, using processing circuitry, such as one or more processors 62 of the control sub-system 50.

For example, to facilitate determining a potential location of a breach along a pipe segment 20, in such embodiments, a control sub-system 50 in a monitoring apparatus 40 may determine a time difference between when a breach bore pressure pattern is detected at different bore sensors 52 in the monitoring apparatus 40 (process block 90). As described above, the control sub-system 50 may determine a bore pressure profile (e.g., trajectory) over time for each of multiple bore sensors 52 in a monitoring apparatus 40 based on corresponding time-stamped sensor data. Thus, by comparing a breach bore pressure pattern against a bore pressure profile associated with a bore sensor 52, the control sub-system 50 may determine a time when the breach bore pressure pattern is detected at the bore sensor 52. For example, the control sub-system 50 may determine that the breach bore pressure pattern is detected at a first bore sensor 52A at a first time based on a first bore pressure profile associated with the first fluid pressure bore sensor 52A and determine that the breach bore pressure pattern is detected at a second bore sensor 52B at a second time based on a second bore pressure profile associated with the second fluid pressure bore sensors 52B. The control sub-system 50 may then determine the time difference between when the breach pattern is detected at the first bore sensor 52A and the second bore sensor 52B based on the duration between the first time and the second time.

To facilitate determining a potential location of a breach along a pipe segment 20, the control sub-system 50 may additionally determine one or more expected propagation speeds of a pressure wave through the pipe bore 32 of the pipe segment 20 (process block 94). In particular, in some embodiments, the control sub-system 50 may determine an expected upstream propagation speed of a pressure wave (process block 98) and/or determine an expected downstream propagation speed of a pressure wave (process block 100). In any case, as described above, a propagation speed of a pressure wave within the pipe bore 32 of a pipe segment 20 generally varies with the flow rate of bore fluid within the pipe bore 32 in a known manner. For example, the control sub-system 50 may determine that the expected upstream propagation speed is the bore fluid flow rate less than the speed of sound and/or determine that the expected downstream propagation speed is the bore fluid flow rate greater than the speed of sound.

Accordingly, to facilitate determining an expected propagation speed of a pressure wave and, thus, a potential location of a breach along a pipe segment 20, in some embodiments, the control sub-system 50 may additionally determine the flow rate of bore fluid within the pipe bore 32 of the pipe segment 20 (process block 92). In some such embodiments, the control sub-system 50 may determine the bore fluid flow rate based on sensor data determined by a bore sensor (e.g., flow meter) 52 that is fluidly connected to the pipe bore 32 of the pipe segment 20. Additionally or alternatively, the control sub-system 50 may determine the bore fluid flow rate based at least in part on operational status of a bore fluid pump 16 that is fluidly connected to the pipe bore 32 of the pipe segment 20.

However, in some instances, the speed of sound may be substantially (e.g., multiple orders of magnitude) faster than the flow rate of bore fluid within the pipe bore 32 of a pipe segment 20. Thus, in some embodiments, the control sub-system 50 may determine that the expected upstream propagation speed and the expected downstream propagation speed of a pressure wave within the pipe bore 32 of the pipe segment 20 are both equal to the speed of sound. In other words, in such embodiments, the control sub-system 50 may determine the expected propagation speed of a pressure wave within the pipe bore 32 of a pipe segment 20 independent of the flow rate of bore fluid within the pipe bore 32 of the pipe segment 20.

In any case, after one or more expected propagation speeds of a pressure wave along a pipe segment 20 are determined, the control sub-system 50 may determine a potential location of a breach along the pipe segment 20 based on the time difference between when the breach pressure pattern is detected at different bore sensors 52, the one or more expected propagation speeds, and the locations of the bore sensors 52 (process block 96). In particular, the control sub-system 50 may identify the potential location of the breach as a location along the pipe segment 20 that would result in the time difference occurring when a pressure wave travels to the locations of the different bore sensors 52 at an expected propagation speed. Additionally, in some embodiments, the control sub-system 50 may indicate the potential location of the breach in a bore monitoring integrity state, for example, which is stored in memory 64 of the control sub-system 50. In this manner, a monitoring apparatus 40 deployed in a pipeline system 10 may be operated to determine a potential location of a breach along a pipe segment 20 deployed in the pipeline system 10, which, at least in some instances, may facilitate improving operational efficiency and/or operational reliability of the pipeline system 10, for example, by facilitating amelioration of the breach.

However, since premised on the sudden formation of a breach producing a one-time negative pressure wave, as described above, execution of a bore monitoring algorithm 66 may provide a relatively short breach detection window.

Additionally, as described above, the ability of a bore monitoring algorithm 66 to detect a breach in a pipe segment 20 may be premised on a breach bore pressure pattern used in the bore monitoring algorithm 66 being properly set to detect a negative pressure wave that results from the sudden formation of a breach while accounting for noise. In other words, in some instances, execution of just a bore monitoring algorithm 66 may result in a breach in a pipe segment 20 inadvertently being missed.

Thus, returning to FIG. 4, to facilitate improving breach detection accuracy, the control sub-system 50 in the monitoring apparatus 40 may execute the annulus monitoring algorithm 68 in addition to the bore monitoring algorithm 66. In particular, the control sub-system 50 may execute the annulus monitoring algorithm 68 based on sensor data indicative of one or more fluid parameters present within the tubing annulus 25 of the pipe segment 20 to facilitate determining whether a breach is potentially present in the pipe segment 20. Since premised on the inner barrier layer 26 and the outer barrier layer 28 of the pipe segment 20 being implemented to provide fluid isolation, a breach in the pipe segment 20 may produce a more persistent change in the one or more annulus fluid parameters, thereby providing a larger breach detection window as compared to the bore monitoring algorithm 66.

Figure 7:
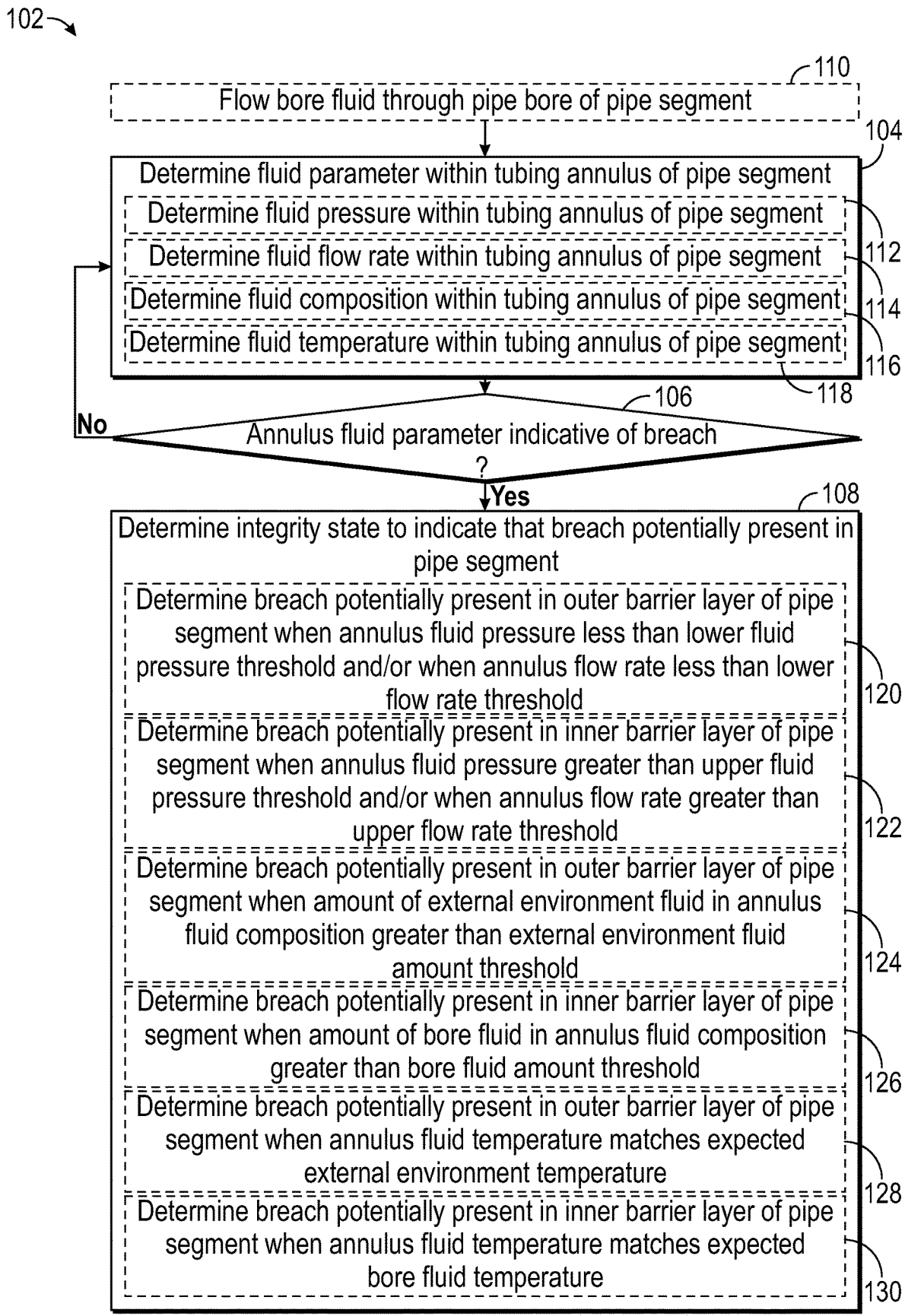
FIG. 7 is a flow diagram of an example of an annulus monitoring process, in accordance with an embodiment of the present disclosure.

To help illustrate, an example of an annulus monitoring process 102 is described in FIG. 7. Generally, the annulus monitoring process 102 includes determining a fluid parameter present within a tubing annulus of a pipe segment (process block 104). Additionally, the annulus monitoring process 102 generally includes determining whether the annulus fluid parameter is indicative of a breach (decision block 106) and determining an integrity state to indicate that a breach is potentially present in the pipe segment when the annulus fluid parameter is indicative of a breach (process block 108).

Although specific blocks are described in a specific order, which corresponds with an embodiment of the present disclosure, it should be appreciated that the example annulus monitoring process 102 is merely intended to be illustrative and non-limiting. In particular, in other embodiments, an annulus monitoring process 102 may include one or more additional blocks and/or omit one or more of the depicted blocks. For example, some embodiments of an annulus monitoring process 102 may additionally include flowing bore fluid through a pipe bore of the pipe segment (process block 110) while other embodiments of an annulus monitoring process 102 do not. Moreover, in some embodiments, an annulus monitoring process 102 may be performed at least in part by executing instructions, such as an annulus monitoring algorithm 68, stored in tangible, non-transitory, computer-readable media, such as memory 64 of a control sub-system 50, using processing circuitry, such as one or more processors 62 of the control sub-system 50.

For example, in such embodiments, a control sub-system 50 in a monitoring apparatus 40, which is deployed in a pipeline system 10, may determine one or more fluid parameters present within the tubing annulus 25 of a pipe segment 20 deployed in the pipeline system 10 (process block 104). For example, in some embodiments, the control sub-system 50 may determine fluid pressure present within the tubing annulus 25 of the pipe segment 20 based on sensor data determined by a fluid pressure annulus sensor 54 (process block 112). Additionally, in some embodiments, the control sub-system 50 may determine fluid flow rate within the tubing annulus 25 of the pipe segment 20 based on sensor data determined by a flow meter annulus sensor 54 (process block 114). Furthermore, in some embodiments, the control sub-system 50 may determine fluid composition within the tubing annulus 25 of the pipe segment 20 based on sensor data determined by a fluid composition annulus sensor 54 (process block 116). Moreover, in some embodiments, the control sub-system 50 may determine fluid temperature within the tubing annulus 25 of the pipe segment 20 based on sensor data determined by a fluid temperature annulus sensor 54 (process block 118).

In any case, as described above, at least in some instances, damage (e.g., one or more breaches) that affects the ability of a pipe segment 20 to provide fluid isolation may form after initial deployment of the pipe segment 20 in a pipeline system 10, for example, during operation of the pipeline system 10. Thus, in some embodiments, an annulus monitoring algorithm 68 may be executed while bore fluid is being actively flowed (e.g., pumped) through the pipe bore 32 of the pipe segment 20 (process block 110). In particular, to facilitate actively flowing bore fluid through the pipe bore 32 of a pipe segment 20, in some embodiments, a control sub-system 50 in the pipeline system 10 may instruct a bore fluid pump 16, which is fluidly connected to the pipe bore 32, to inject (e.g., supply) bore fluid into the pipe bore 32, for example, via one or more control signals. Nevertheless, in other embodiments, an annulus monitoring algorithm 68 may be executed while bore fluid is not being actively flowed through the pipe bore 32 of a pipe segment 20 being monitored.

In any case, the control sub-system 50 may then determine whether an annulus fluid parameter is indicative of a breach and, when the annulus fluid parameter is indicative of a breach, determine an annulus monitoring integrity state to indicate that a breach is potentially present in the pipe segment 20 (process block 108). In fact, in some embodiments, executing an annulus monitoring algorithm 68 may enable the control sub-system 50 to determine what one or more tubing layers of the pipe segment 20 potentially include a breach. For example, since environmental conditions external to a pipe segment 20 are generally at a lower pressure, in some such embodiments, the control sub-system 50 may determine that a breach is potentially present in the outer barrier layer 28 of the pipe segment 20 when fluid pressure within the tubing annulus 25 of the pipe segment 20 drops below a lower fluid pressure threshold and/or when fluid flow rate within the tubing annulus 25 of the pipe segment 20 drops below a lower flow rate threshold (process block 120). On the other hand, when its pipe bore 32 is pressurized to produce fluid flow, the control sub-system 50 may determine that a breach is potentially present in the inner barrier layer 26 of the pipe segment 20 when fluid pressure within the tubing annulus 25 of the pipe segment 20 exceeds an upper fluid pressure threshold and/or when fluid flow rate within the tubing annulus 25 of the pipe segment 20 exceeds an upper flow rate threshold (process block 122).

Additionally, since the outer barrier layer 28 of the pipe segment 20 is generally implemented to provide fluid isolation, in some such embodiments, the control sub-system 50 may determine that a breach is potentially present in the outer barrier layer 28 of the pipe segment 20 when the amount of external environment fluid within the tubing annulus 25 of the pipe segment 20 is greater than an external environment fluid amount threshold, for example, which is set based at least in part on an expected permeation rate of external environment fluid through the outer barrier layer 28 when a breach is not potentially present therein (process block 124). Similarly, since the inner barrier layer 26 of the pipe segment 20 is generally implemented to provide fluid isolation, the control sub-system 50 may determine that a breach is potentially present in the inner barrier layer 26 of the pipe segment 20 when the amount of bore fluid within the tubing annulus 25 of the pipe segment is greater than a bore fluid amount threshold, for example, which is set based at least in part on an expected permeation rate of bore fluid through the inner barrier layer 26 when a breach is not potentially present therein (process block 126). Furthermore, since the outer barrier layer 28 of the pipe segment 20 may provide temperature insulation, in some such embodiments, the control sub-system 50 may determine that a breach is potentially present in the outer barrier layer 28 of the pipe segment 20 when fluid temperature within the tubing annulus 25 of the pipe segment 20 matches an expected external environment temperature, for example, within an error threshold that facilitates accounting for measurement (e.g., sensor) error (process block 128). Similarly, since the inner barrier layer 26 of the pipe segment 20 may provide temperature insulation, the control sub-system 50 may determine that a breach is potentially present in the inner barrier layer 26 of the pipe segment 20 when fluid temperature within the tubing annulus 25 of the pipe segment 20 matches an expected bore fluid temperature, for example, within an error threshold that facilitates accounting for measurement (e.g., sensor) error (process block 130).

Although capable of identifying when a breach is just in the outer barrier layer 28 of a pipe segment 20, at least in some instances, the influence of bore fluid on a fluid parameter present within the tubing annulus 25 of the pipe segment 20 may over power the influence of external environmental conditions on the fluid parameter present within the tubing annulus 25 of the pipe segment 20 when a breach is present in both the outer barrier layer 28 and the inner barrier layer 26 of the pipe segment 20. In other words, in such instances, when a breach is present in the inner barrier layer 26 and another breach is present in the outer barrier layer 28, the control sub-system 50 may only detect that a breach is potentially present in the inner barrier layer 26. However, a breach in the inner barrier layer 26 of a pipe segment 20 may generally result in a corresponding breach forming in the outer barrier layer 28 of the pipe segment 20 when a breach is not already present within the outer barrier layer 28, for example, due to the pipe bore 32 of the pipe segment 20 being pressurized to produce fluid flow therein. Accordingly, in some embodiments, when a control sub-system 50 determines that a breach is potentially present in the inner barrier layer 26 of a pipe segment 20, the control sub-system 50 may determine (e.g., assume) that another breach is or will be formed through the outer barrier layer 28 and, thus, indicate that active fluid flow through the pipe segment 20 should be ceased.

On the other hand, a breach in the outer barrier layer 28 of a pipe segment 20 is not necessarily indicative of a breach in the inner barrier layer 26 of the pipe segment 20, for example, due to external environmental conditions generally being at a lower pressure. In other words, a breach in the outer barrier layer 28 of the pipe segment 20 does not necessarily enable fluid flow directly through the tubing 22 of the pipe segment 20. Accordingly, in some embodiments, when a control sub-system 50 determines that a breach is potentially just present in the outer barrier layer 28 of a pipe segment 20, the control sub-system 50 may indicate that bore fluid can continue actively being flowed through the pipe segment 20, which, at least in some instances, may facilitate improving pipeline uptime.

In any case, in some embodiments, the control sub-system 50 may then store the annulus monitoring integrity state, which indicates whether a breach is potentially present in the pipe segment, in memory 64 to enable subsequent retrieval. In fact, when a breach is potentially present, in some embodiments, the control sub-system 50 may additionally indicate what tubing layer of the pipe segment 20 potentially includes the breach in the annulus monitoring integrity state. In this manner, a monitoring apparatus 40 deployed in a pipeline system 10 may be operated to facilitate detecting whether a breach is present in a pipe segment 20 deployed in the pipeline system 10 based on one or more fluid parameters present within the tubing annulus 25 of the pipe segment 20.

However, returning to FIG. 4, to facilitate improving breach detection accuracy, the control sub-system 50 may additionally execute the cross-check algorithm 70. In particular, as will be described in more detail below, the control sub-system 50 may execute the cross-check algorithm 70 to process a bore monitoring (e.g., first) integrity state determined by execution of the bore monitoring algorithm 66 and an annulus monitoring (e.g., second) integrity-state determined by execution of the annulus monitoring algorithm 68. For example, the control sub-system 50 may execute the cross-check algorithm to determine a cross-checked integrity-state, which indicates whether a breach is actually present in a pipe segment 20, based on the bore monitoring integrity state and the annulus monitoring integrity state.

Figure 8:
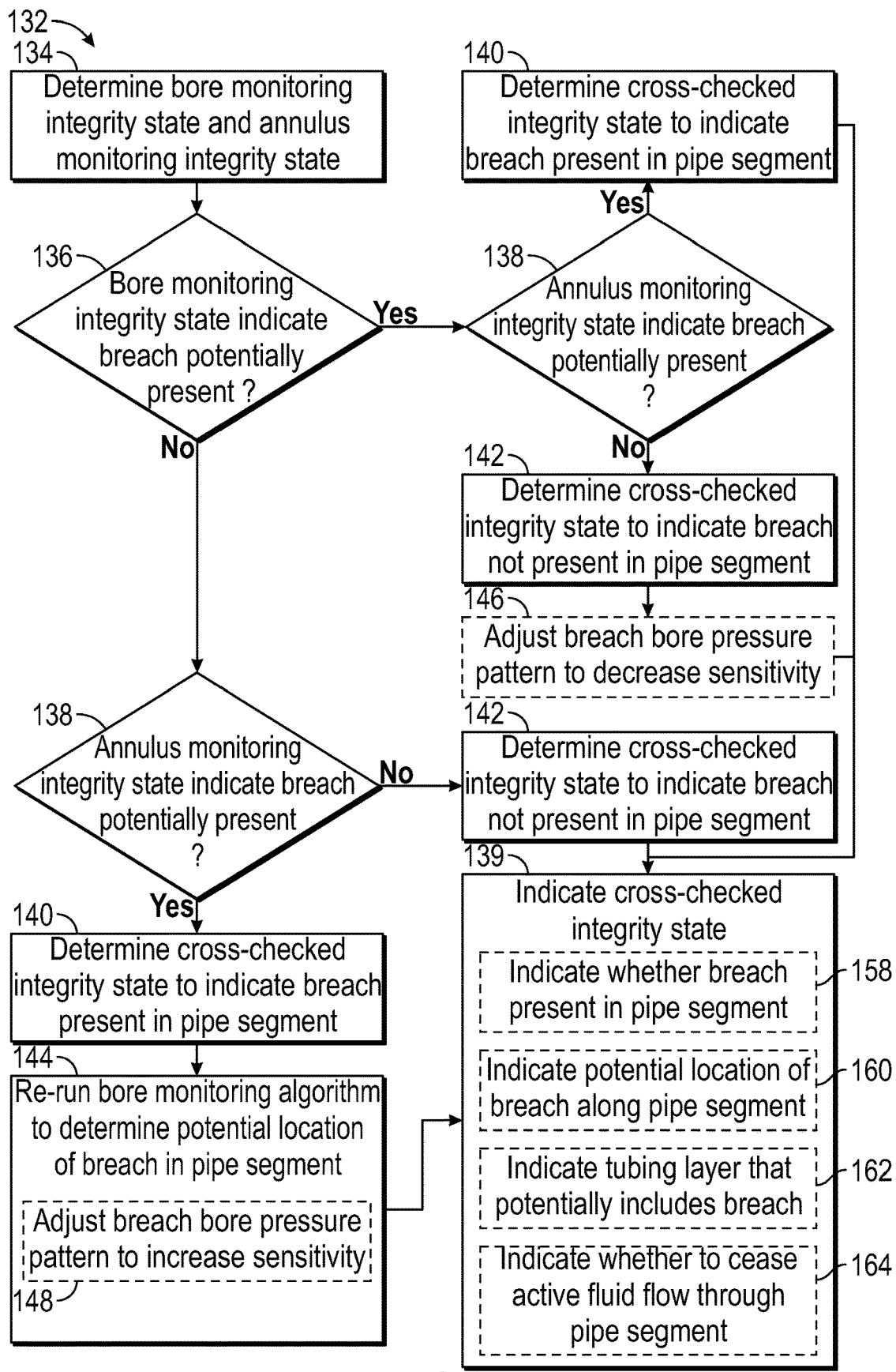
FIG. 8 is a flow diagram of an example of a cross-checking process, in accordance with an embodiment of the present disclosure.

To help illustrate, an example of a cross-checking process 132 is described in FIG. 8. Generally, the cross-checking process 132 includes determining a bore monitoring integrity state and an annulus monitoring integrity state (process block 134), determining whether the bore monitoring integrity state indicates that a breach is potentially present in a pipe segment (process block 136), determining whether the annulus monitoring integrity state indicates that a breach is potentially present in the pipe segment (process block 138), and indicating a cross-checked integrity state (process block 139). Additionally, the cross-checking process 132 generally includes determining the cross-checked integrity state to indicate that a breach is present in the pipe segment when the bore monitoring integrity state and the annulus monitoring integrity state both indicate that a breach is potentially present or when the bore monitoring integrity state indicates that a breach is not potentially present and the annulus monitoring integrity state indicates that a breach is potentially present (process block 140) and determining the cross-checked integrity state to indicate that a breach is not present in the pipe segment when the bore monitoring integrity state and the annulus monitoring integrity state both indicate that a breach is not potentially present or when the bore monitoring integrity state indicates that a breach is potentially present and the annulus monitoring integrity state indicates that a breach is not potentially present (process block 142). Furthermore, when the bore monitoring integrity state indicates that a breach is not potentially present and the annulus monitoring integrity state indicates that a breach is potentially present, the cross-checking process 132 generally includes re-running a bore monitoring algorithm to determine a potential location of a breach in the pipe segment (process block 144).

Although specific blocks are described in a specific order, which corresponds with an embodiment of the present disclosure, it should be appreciated that the example cross-checking process 132 is merely intended to be illustrative and non-limiting. In particular, in other embodiments, a cross-checking process 132 may include one or more additional blocks and/or omit one or more of the depicted blocks. For example, some embodiments of a cross-checking process 132 may additionally include adjusting a breach bore pressure pattern to decrease sensitivity when the bore monitoring integrity state indicates that a breach is potentially present and the annulus monitoring integrity state indicates that a breach is not potentially present (process block 146). Additionally, in other embodiments, one or more of the depicted blocks may be performed in a different order, for example, such that whether the annulus monitoring integrity state indicates that a breach is potentially present is determined before determining whether the bore monitoring integrity state indicates that a breach is potentially present. Moreover, in some embodiments, a cross-checking process 132 may be performed at least in part by executing instructions, such as a cross-checking algorithm 70, stored in tangible, non-transitory, computer-readable media, such as memory 64 of a control sub-system 50, using processing circuitry, such as one or more processors 62 of the control sub-system 50.

For example, in such embodiments, a control sub-system 50 in a monitoring apparatus 40 may determine a bore monitoring integrity state that results from execution of a bore monitoring algorithm 66 and an annulus monitoring integrity state that results from execution of an annulus monitoring algorithm 68 (process block 134). As described above, in some embodiments, a bore monitoring integrity state and an annulus monitoring integrity state may be stored in memory 64 of the control sub-system 50. Thus, in such embodiments, the control sub-system 50 may determine the bore monitoring integrity state and the annulus monitoring integrity at least in part by retrieving them from memory 64.

As described above, a bore monitoring integrity state may indicate whether a breach is potentially present in a pipe segment 20, for example, in addition to indicating a potential location of a breach along the pipe segment 20 when the breach is expected to be present in the pipe segment 20. Additionally, as described above, an annulus monitoring integrity state may indicate whether a breach is potentially present in a pipe segment, for example, in addition to a tubing layer that potentially includes a breach when the breach is expected to be present in the pipe segment 20. When the bore monitoring integrity state and the annulus monitoring state both indicate that a breach is not potentially present in the pipe segment 20, the control sub-system 50 may determine a cross-checked integrity state to indicate that a breach is not present in the pipe segment 20 (process block 142). Similarly, when the bore monitoring integrity state and the annulus monitoring integrity state both indicate that a breach is potentially present in the pipe segment 20, the control sub-system 50 may determine the cross-checked integrity state to indicate that a breach is present in the pipe segment 20, for example, in addition to indicating a potential location of the breach along the pipe segment 20 and/or a tubing layer of the pipe segment 20 that potentially includes the breach (process block 140).

However, at least in some instances, a bore monitoring integrity state may indicate that a breach is potentially present in a pipe segment 20 while an annulus monitoring integrity state indicates that a breach is not potentially present in the pipe segment 20 or vice versa. In such instances, the control sub-system 50 may generally defer to the integrity state determined by execution of the annulus monitoring algorithm 68, for example, due to the annulus monitoring algorithm 68 generally providing a larger breach detection window as compared to a corresponding bore monitoring algorithm 66. In other words, when the bore monitoring integrity state indicates that a breach is potentially present and the annulus monitoring integrity state indicates that a breach is not potentially present, the control sub-system 50 may determine the cross-checked integrity state to indicate that a breach is not actually present in the pipe segment 20 (process block 142). That is, in such instances, the control sub-system 50 may determine that execution of a corresponding bore monitoring algorithm 66 resulted in a false positive.

When execution of a bore monitoring algorithm 66 results in a false positive, to facilitate improving subsequent breach detection accuracy, in some embodiments, the control sub-system 50 may adaptively adjust a breach bore pressure pattern used in the bore monitoring algorithm 66 to decrease negative pressure wave sensitivity (process block 146). In particular, as mentioned above, in some such embodiments, a breach bore pressure pattern used in a bore monitoring algorithm may be adaptively adjusted to decrease negative pressure wave sensitivity via a machine-learning algorithm 72 executed by a control sub-system 50. For example, to reduce sensitivity, the machine-learning algorithm 72 may adaptively set a breach bore pressure pattern to exclude a breach bore pressure pattern that previously resulted in a false positive.

On the other hand, when the bore monitoring integrity state indicates that a breach is not potentially present and the annulus monitoring integrity state indicates that a breach is potentially present, the control sub-system 50 may determine the cross-checked integrity state to indicate that a breach is actually present in the pipe segment 20 (process block 140). However, as mentioned above, the ability of an annulus monitoring algorithm 68 to identify a potential location of a breach along a pipe segment 20 may generally be limited as compared to a corresponding bore monitoring algorithm 66. Accordingly, when the bore monitoring integrity state indicates that a breach is not potentially present and the annulus monitoring integrity state indicates that a breach is potentially present, the control sub-system 50 may re-run the bore monitoring algorithm 66 to determine the potential location of the breach along the pipe segment 20 (process block 144).

However, since the previous execution cycle of the bore monitoring algorithm 66 inadvertently missed the breach, a breach bore pressure pattern used in the bore monitoring algorithm 66 may be adaptively adjusted before the bore monitoring algorithm 66 is re-run. In particular, to facilitate detecting the presence of the breach and, thus, the location of the breach along the pipe segment 20, the breach bore pressure pattern used in the bore monitoring algorithm 66 may be adaptively adjusted to increase negative pressure wave sensitivity (process block 148). In fact, as mentioned above, in some embodiments, a breach bore pressure pattern used in a bore monitoring algorithm 66 may be adaptively adjusted to increase negative pressure wave sensitivity via a machine-learning algorithm 72 executed by a control sub-system 50.

Figure 9:
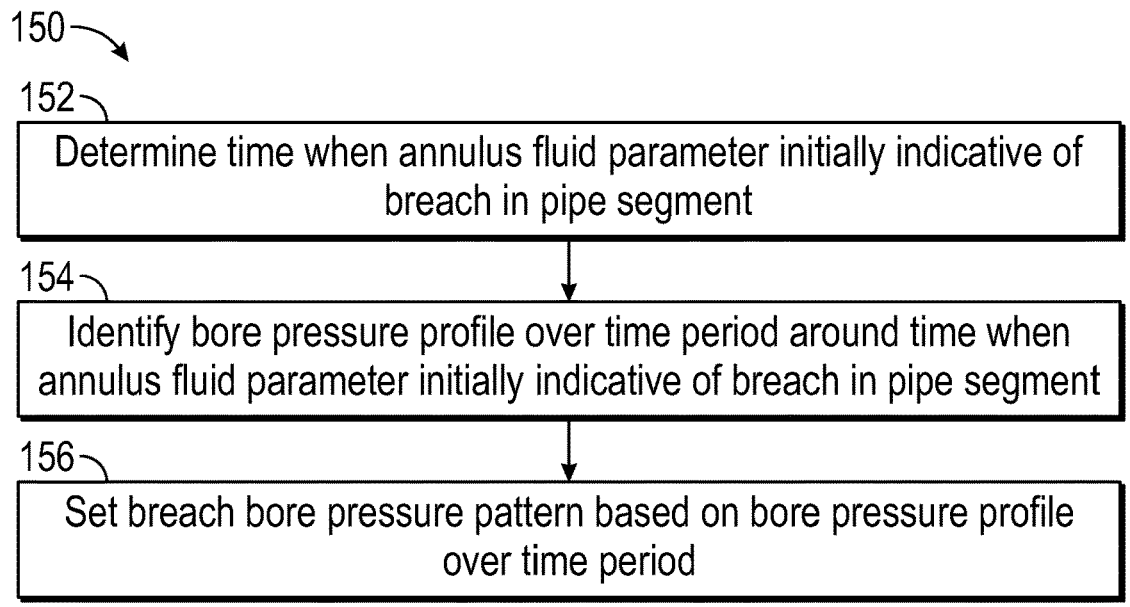
FIG. 9 is a flow diagram of an example of a process for adaptively adjusting a breach bore pressure pattern used in a bore monitoring algorithm, in accordance with an embodiment of the present disclosure.

To help illustrate, an example of a process 150 for adaptively adjusting a bore pressure pattern used in a bore monitoring algorithm 66 to increase negative pressure wave sensitivity is described in FIG. 9. Generally, the process 150 includes determining a time when an annulus fluid parameter is initially indicative of a breach being present in a pipe segment (process block 152) and identifying a bore pressure profile over a time period around when the annulus fluid parameter is initially indicative of the breach (process block 154). Additionally, the process 150 generally includes setting a breach bore pressure pattern based on the bore pressure profile over the time period (process block 156).

Although specific blocks are described in a specific order, which corresponds with an embodiment of the present disclosure, it should be appreciated that the example process 150 is merely intended to be illustrative and non-limiting. In particular, in other embodiments, a process 150 for adaptively adjusting a bore pressure pattern used in a bore monitoring algorithm 66 to increase negative pressure wave sensitivity may include one or more additional blocks and/or omit one or more of the depicted blocks. Moreover, in some embodiments, a process 150 for adaptively adjusting a bore pressure pattern used in a bore monitoring algorithm 66 to increase negative pressure wave sensitivity may be performed at least in part by executing instructions, such as a machine-learning algorithm 72, stored in tangible, non-transitory, computer-readable media, such as memory 64 of a control sub-system 50, using processing circuitry, such as one or more processors 62 of the control sub-system 50.

For example, in such embodiments, a control sub-system 50 in a monitoring apparatus 40 may determine a time when an annulus fluid parameter indicated in sensor data determined by an annulus sensor 54 is initially indicative of a breach being present in a pipe segment 20 (process block 152). In particular, in some such embodiments, the control sub-system 50 may determine a time when sensor data determined by the annulus sensor 54 is initially indicative of fluid pressure within the tubing annulus 25 of the pipe segment 20 exceeding an upper fluid pressure threshold or dropping below a lower fluid pressure threshold. Additionally, in some such embodiments, the control sub-system 50 may determine a time when sensor data determined by an annulus sensor 54 is initially indicative of fluid flow rate within the tubing annulus 25 of the pipe segment 20 exceeding an upper fluid flow rate threshold or dropping below a lower fluid flow rate threshold. Furthermore, in some such embodiments, the control sub-system 50 may determine a time when sensor data determined by an annulus sensor 54 is initially indicative of fluid temperature within the tubing annulus 25 of the pipe segment matching an expected bore fluid temperature or an expected external environment temperature. Moreover, in some such embodiments, the control sub-system 50 may determine a time when sensor data determined by an annulus sensor 54 is initially indicative of fluid composition within the tubing annulus 25 of the pipe segment exceeding an environment fluid amount threshold or a bore fluid amount threshold.

In any case, the control sub-system 50 may then determine a bore pressure profile associated with each of one or more bore sensors 52 in the monitoring apparatus 40 over a time period around the time when the annulus fluid parameter is initially indicative of a breach (process block 154). In particular, in some embodiments, the control sub-system 50 may select the time period over which to determine a bore pressure profile associated with a bore sensor 52 based at least in part on the difference between an expected propagation speed of a pressure wave within the pipe bore 32 of the pipe segment 20 and an expected propagation speed of an annulus fluid parameter change within the tubing annulus 25 of the pipe segment 20. For example, when the expected propagation speed of a pressure wave within the pipe bore 32 matches the expected propagation speed of an annulus fluid parameter change within the tubing annulus 25, the control sub-system may determine a bore pressure profile over a time period centered around the time when the annulus fluid parameter is initially indicative of a breach being present. Additionally, when the expected propagation speed of a pressure wave within the pipe bore 32 is faster than the expected propagation speed of an annulus fluid parameter change within the tubing annulus 25, the control sub-system 50 may determine a bore pressure profile over a time period that precedes the time when the annulus fluid parameter is initially indicative of a breach being present. Furthermore, when the expected propagation speed of a pressure wave within the pipe bore 32 is slower than the expected propagation speed of an annulus fluid parameter change within the tubing annulus 25, the control sub-system 50 may determine a bore pressure profile over a time period that follows the time when the annulus fluid parameter is initially indicative of a breach being present.

The control sub-system 50 may then set a breach bore pressure pattern to be used during a subsequent execution cycle of a bore monitoring algorithm 66 based on one or more bore pressure profiles over the time period (process block 156). In particular, the control sub-system 50 may set the breach bore pressure pattern based at least in part on patterns of bore pressure that occur during a bore pressure profile associated with a bore sensor 52. More specifically, to facilitate improving the ability of a bore monitoring algorithm 66 to detect a breach during a subsequent execution cycle, the control sub-system 50 may set the breach bore pressure pattern at least in part by cross-correlating bore pressure patterns from bore pressure profiles associated with multiple different bore sensors 52, for example, to identify a bore pressure pattern that occurs in each of the bore pressure profiles while accounting for noise. In this manner, a monitoring apparatus 40 deployed in a pipeline system 10 may operate to adaptively adjust a breach bore pressure pattern used in the monitoring apparatus 40 to facilitate increasing negative pressure wave sensitivity, which, at least in some instances, may facilitate improving subsequent breach detection accuracy provided by a bore monitoring algorithm 66.

In any case, returning to the process 132 of FIG. 8, the control sub-system 50 in the monitoring apparatus 40 may then indicate the cross-checked integrity state (process block 139). In particular, to facilitate indicating the cross-checked integrity state, in some embodiments, the control sub-system 50 may instruct an electronic device (e.g., I/O device 60) to display a graphical user interface (GUI) that presents a visual representation of the cross-checked integrity state. Additionally or alternatively, the control sub-system may indicate the cross-checked integrity state at least in part by instructing a speaker (e.g., I/O device 60) to output sound that provides an audio representation of the cross-checked integrity state.

In any case, as described above, a cross-checked integrity state may generally indicate whether a breach is actually present within a pipe segment 20. Thus, indicating the cross-checked integrity state may include indicating whether a breach is actually present in the pipe segment 20 (process block 158). Additionally, as described above, when a breach is present in a pipe segment 20, in some embodiments, a corresponding cross-checked integrity state may indicate a potential location of the breach along the pipe segment 20, for example, which is determined at least in part by executing a bore monitoring algorithm 66. Thus, in such embodiments, when a breach is present, indicating the cross-checked integrity state may include indicating a potential location of the breach along the pipe segment 20 (process block 160).

Furthermore, as described above, in some embodiments, when a breach is present in a pipe segment 20, a corresponding cross-checked integrity state may indicate one or more tubing layers of the pipe segment 20 that potentially include the breach, for example, which is determined at least in part by executing an annulus monitoring algorithm 68. Thus, in such embodiments, when a breach is present, indicating the cross-checked integrity state may include indicating a tubing layer of the pipe segment 20 that potentially includes the breach (process block 162). For example, the control sub-system 50 may indicate whether a breach is potentially present in the inner barrier layer 26 of the pipe segment 20 and, thus, a breach can be assumed as being present in the outer barrier layer 28 of the pipe segment 20. As another example, the control sub-system 50 may indicate whether a breach is just potentially present in the outer barrier layer 28 of the pipe segment 20.

As described above, in some embodiments, determining a tubing layer of a pipe segment 20 that potentially includes a breach may enable a control sub-system 50 to determine whether continued fluid flow through the pipe segment 20 is expected to reduce operational efficiency and/or operational reliability of a corresponding pipeline system 10 and, thus, whether the pipeline system 10 should cease actively flowing bore fluid through the pipe segment 20. Accordingly, in such embodiments, indicating the cross-checked integrity state may include indicating whether to cease actively flowing bore fluid through the pipe segment 20 (process block 164). For example, since a breach in the outer barrier layer 28 of a pipe segment 20 can generally be assumed when a breach is potentially present in the inner barrier layer 26 of the pipe segment 20, the control sub-system 50 may indicate that the pipeline system 10 should cease actively flowing bore fluid through the pipe segment 20 when a breach is detected in the inner barrier layer 26 of the pipe segment 20. On the other hand, since a breach in the inner barrier layer 26 of a pipe segment 20 cannot generally be assumed when a breach is present in the outer barrier layer 28 of the pipe segment 20, the control sub-system 50 may indicate that the pipeline system 10 can continue actively flowing bore fluid through the pipe segment 20 when just a breach in the outer barrier layer 28 of the pipe segment 20 is detected, which, at least in some instances, may facilitate increasing uptime of the pipeline system 10.

In any case, in this manner, the present disclosure provides techniques for implementing and/or operating a monitoring apparatus 40 in a pipeline system 10 based at least in part on one or more bore fluid parameters determined by bore sensors 52 and one or more annulus fluid parameters determined by one or more annulus sensors 54 to facilitate improving breach detection accuracy, which, at least in some instances, may facilitate improving operational efficiency and/or operational reliability of the pipeline system 10. Although embodiments of the techniques in which the bore sensors 52 and the one or more annulus sensors 54 in a monitoring apparatus 40 are each turned on are described, in other embodiments, the bore sensors 52 or the one or more annulus sensors 54 may be selectively turned off for some period of time, for example, to facilitate saving power. To enable the bore sensors 52 or the one or more annulus sensors 52 to be selectively turned off while improving breach detection accuracy, in some embodiments, a control sub-system 50 in the monitoring apparatus 40 may implement a virtual sensor that enables the control sub-system 50 to determine a fluid parameter expected to be detected via a turned-off sensor based on a fluid parameter determined via a turned-on sensor, for example, at least in part by executing a machine-learning algorithm 72 that learns expected relationships between one or more bore fluid parameters determined via the bore sensors 52 and one or more annulus fluid parameters determined via the one or more annulus sensors 54.

Figure 10:
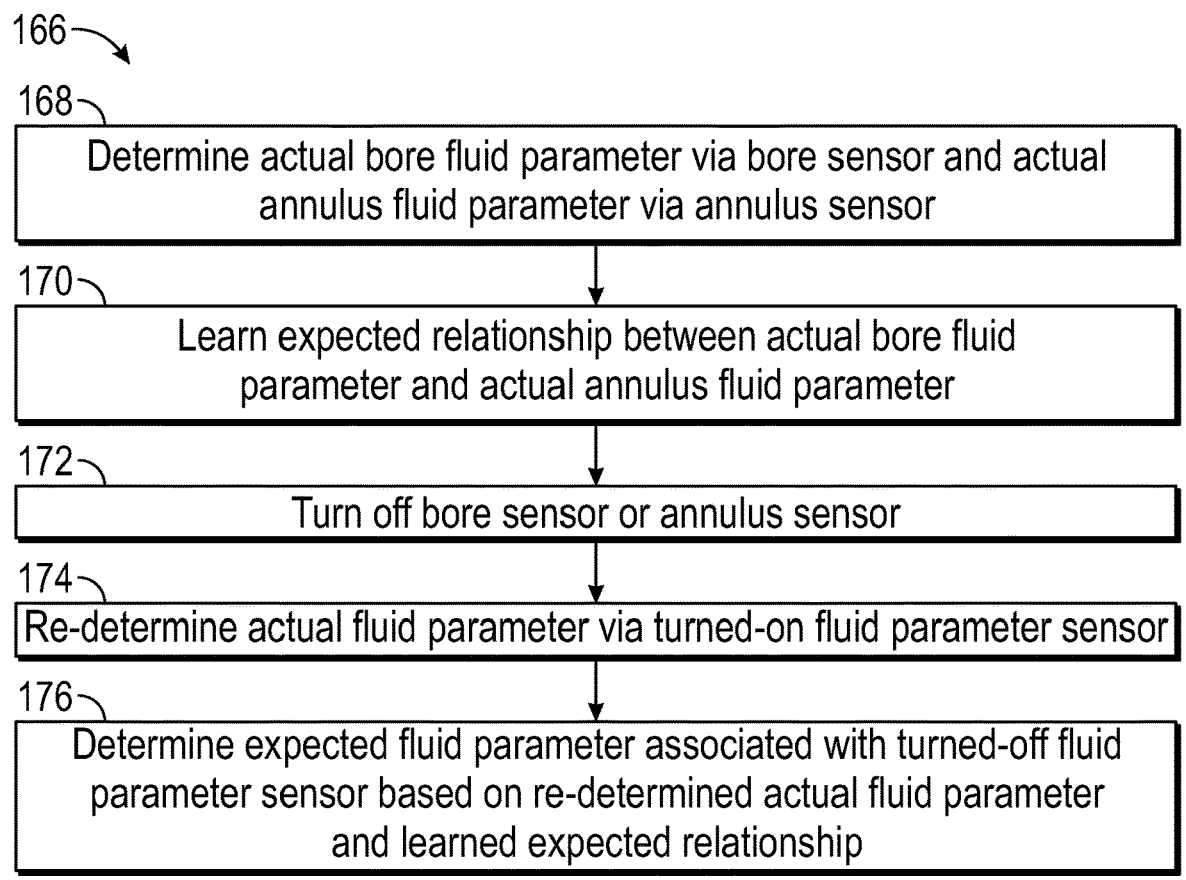
FIG. 10 is a flow diagram of an example of a process for implementing a virtual sensor in a monitoring apparatus, in accordance with an embodiment of the present disclosure.

To help illustrate, an example of a process 166 for implementing a virtual sensor in a monitoring apparatus 40 is described in FIG. 10. Generally, the process 166 includes determining an actual bore fluid parameter via a bore sensor and an actual annulus fluid parameter via an annulus sensor (process block 168) and learning an expected relationship between the actual bore fluid parameter and the actual annulus fluid parameter (process block 170). Additionally, the process 166 generally includes turning off the bore sensor or the annulus sensor (process block 172), re-determining an actual fluid parameter via a turned-on fluid parameter sensor (process block 174), and determining an expected fluid parameter associated with a turned-off fluid parameter sensor based on the re-determined actual fluid parameter and the learned expected relationship (process block 176).

Although specific blocks are described in a specific order, which corresponds with an embodiment of the present disclosure, it should be appreciated that the example process 166 is merely intended to be illustrative and non-limiting. In particular, in other embodiments, a process 166 for implementing a virtual sensor in a monitoring apparatus 40 may include one or more additional blocks and/or omit one or more of the depicted blocks. Moreover, in some embodiments, a process 166 for implementing a virtual sensor in a monitoring apparatus 40 may be performed at least in part by executing instructions, such as a machine-learning algorithm 72, stored in tangible, non-transitory, computer-readable media, such as memory 64 of a control sub-system 50, using processing circuitry, such as one or more processors 62 of the control sub-system 50.

For example, in such embodiments, a control sub-system 50 in a monitoring apparatus 40 may determine one or more actual fluid parameters present within the pipe bore 32 of a pipe segment 20 based on sensor data determined by bore sensors 52 and one or more actual fluid parameter present within the tubing annulus 25 of the pipe segment 20 based on sensor data determined by one or more annulus sensors 54 (process block 168). For example, the control sub-system 50 may determine fluid pressure and/or fluid flow rate that is present within the pipe bore 32 of the pipe segment 20 based on sensor data determined by the bore sensors 52. Additionally, the control sub-system 50 may determine fluid pressure, fluid temperature, fluid flow rate, fluid composition, or any combination thereof that is present within the tubing annulus 25 based on sensor data determined by the one or more annulus sensors 54.

The control sub-system 50 may then learn an expected relationship between the one or more actual bore fluid parameters and the one or more actual annulus fluid parameters (process block 170). For example, the control sub-system 50 may analyze the actual fluid pressure within the pipe bore 32 and the actual fluid pressure and actual fluid flow rate within the tubing annulus 25 to determine how actual annulus fluid flow rate and actual annulus fluid pressure vary with actual bore fluid pressure. Additionally or alternatively, the control sub-system 50 may analyze the actual fluid pressure within the pipe bore 32 and the actual fluid pressure and actual fluid flow rate within the tubing annulus 25 to determine how actual bore fluid pressure varies with actual annulus fluid flow rate and actual annulus fluid pressure.

After learning one or more expected relationships, the bore sensors 52 or the one or more annulus sensors 54 in the monitoring apparatus 40 may be turned off, for example, to facilitate conserving power (process block 172). In particular, in some embodiments, the control sub-system 50 may instruct a fluid parameter sensor to turn off via a control signal. However, in other embodiments, a fluid parameter sensor in a monitoring apparatus 40 may be manually turned off, for example, by a user, an operator, or a service technician.

In any case, the control sub-system 50 may then re-determine one or more actual fluid parameters based on sensor data subsequently determined by the one or more turned-on fluid parameter sensors (process block 174). In other words, when the bore sensors 52 are turned off, the control sub-system 50 may re-determine the one or more actual annulus fluid parameters based on sensor data determined by the one or more annulus sensors 54. On the other hand, when the one or more annulus sensors 54 are turned off, the control sub-system 50 may re-determine the one or more bore fluid parameters based on sensor data determined by the bore sensors 52.

Based on the one or more re-determined actual fluid parameters and the one or more learned expected relationships, the control sub-system 50 may then determine one or more expected fluid parameters associated with the one or more turned-off fluid parameter sensors (process block 176). For example, when the bore sensors 52 are turned off, the control sub-system 50 may apply a learned expected relationship to the one or more re-determined actual annulus fluid parameters to determine one or more bore fluid parameters that are expected to have been detected if the bore sensors 52 were turned on. In such instances, the control sub-system 50 may then execute a bore monitoring algorithm 66 based on the one or more expected bore fluid parameters, for example, in accordance with the example bore monitoring process 74 of FIG. 5.

On the other hand, when the one or more annulus sensors 54 are turned off, the control sub-system 50 may apply a learned expected relationship to the one or more re-determined actual bore fluid parameters to determine one or more annulus fluid parameters that are expected to have been detected if the one or more annulus sensors 54 were turned on. In such instances, the control sub-system 50 may then execute an annulus monitoring algorithm 68 based on the one or more expected annulus fluid parameters, for example, in accordance with the example annulus monitoring process 102 of FIG. 7. In this manner, the present disclosure provides techniques for implementing and/or operating a monitoring apparatus in a pipeline system to facilitate improving breach detection accuracy, which, at least in some instances, may facilitate improving operational efficiency and/or operational reliability of the pipeline system.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A system comprising:
   a pipe segment, wherein the pipe segment comprises tubing that defines a pipe bore and a fluid conduit within a tubing annulus of the pipe segment; and
   a monitoring apparatus, wherein the monitoring apparatus comprises:
      a plurality of bore sensors fluidly connected to the pipe bore of the pipe segment;
      an annulus sensor fluidly connected to the fluid conduit defined within the tubing annulus of the pipe segment; and a control sub-system communicatively coupled to the plurality of bore sensors and the annulus sensor, wherein the control sub-system is configured to determine whether a breach is present in the tubing of the pipe segment based at least in part on first sensor data determined by the plurality of bore sensors to be indicative of a bore fluid parameter present within the pipe bore of the pipe segment and second sensor data determined by the annulus sensor to be indicative of an annulus fluid parameter present within the tubing annulus of the pipe segment.

2. The system of claim 1, comprising a pipe fitting, wherein:
an end of the tubing of the pipe segment is secured and sealed in a tubing cavity of the pipe fitting such that a fitting bore of the pipe fitting is fluidly connected to the pipe bore of the pipe segment;
the pipe fitting comprises a bore monitoring port that opens to the fitting bore of the pipe fitting; and
a bore sensor in the plurality of bore sensors is fluidly connected to the bore monitoring port on the pipe fitting.

3. The system of claim 2, comprising an other pipe fitting, wherein:
another end of the tubing of the pipe segment is secured and sealed in another tubing cavity of the other pipe fitting such that an other fitting bore of the other pipe fitting is fluidly connected to the pipe bore of the pipe segment;
the other pipe fitting comprises an other bore monitoring port that opens to the other fitting bore of the other pipe fitting; and
another bore sensor in the plurality of bore sensors is fluidly connected to the other bore monitoring port on the other pipe fitting.

4. The system of claim 1, comprising a pipe fitting, wherein:
an end of the tubing of the pipe segment is secured and sealed in a tubing cavity of the pipe fitting such that a fitting bore of the pipe fitting is fluidly connected to the pipe bore of the pipe segment;
the pipe fitting comprises an annulus vent port that is fluidly connected to the fluid conduit defined with the tubing annulus of the pipe segment; and
the annulus sensor is fluidly connected to the annulus vent port on the pipe fitting.

5. The system of claim 4, comprising:
an other pipe fitting; and
an other annulus sensor, wherein:
another end of the tubing of the pipe segment is secured and sealed in another tubing cavity of the other pipe fitting such that another fitting bore of the other pipe fitting is fluidly connected to the pipe bore of the pipe segment;
the other pipe fitting comprises an other annulus vent port that is fluidly connected to the fluid conduit defined within the tubing annulus of the pipe segment; and
the other annulus sensor is fluidly connected to the other annulus vent port on the other pipe fitting.

6. The system of claim 1, wherein the control sub-system is configured to:
determine a bore monitoring integrity state that indicates whether a breach is potentially present in the tubing of the pipe segment based at least on first sensor data determined by the plurality of bore sensors;
determine an annulus monitoring integrity state that indicates whether a breach is potentially present in the tubing of the pipe segment based on second sensor data determined by the annulus sensor; and
determine a cross-checked integrity state that indicates whether a breach is actually present in the tubing of the pipe segment based on the bore monitoring integrity state and the annulus monitoring integrity state.

7. The system of claim 6, wherein the control sub-system is configured to determine the bore monitoring integrity state at least in part by:
determining a plurality of bore pressure profiles each associated with a bore sensor in the plurality of bore sensors based at least in part on the first sensor data determined by the plurality of bore sensors;
determining a breach bore pressure pattern expected to result from a negative pressure wave produced by sudden formation of a breach through the tubing of the pipe segment;
determining the bore monitoring integrity state to indicate that a breach is potentially present in the tubing of the pipe segment when the breach bore pressure pattern is detected in the plurality of bore pressure profiles; and
determining the bore monitoring integrity state to indicate that a breach is not potentially present in the tubing of the pipe segment when the breach bore pressure pattern is not detected in the plurality of bore pressure profiles.

8. The system of claim 7, wherein, when a breach is potentially present in the tubing of the pipe segment, the control sub-system is configured to determine a potential location of the breach along the pipe segment based at least in part on when the breach bore pressure pattern is detected at different bore sensors in the plurality of bore sensors.

9. The system of claim 6, wherein the control sub-system is configured to determine the annulus monitoring integrity state at least in part by:
determining fluid pressure, fluid flow rate, fluid composition, fluid temperature, or any combination thereof present within the tubing annulus of the pipe segment based on the second sensor data determined by the annulus sensor; and
determining the annulus monitoring integrity state to indicate that a breach is potentially present in the tubing of the pipe segment when:
the fluid pressure within the tubing annulus of the pipe segment exceeds an upper fluid pressure threshold or drops below a lower fluid pressure threshold;
the fluid flow rate within the tubing annulus of the pipe segment exceeds an upper fluid flow rate threshold or drops below a lower fluid flow rate threshold;
the fluid composition within the tubing annulus of the pipe segment includes more than a bore fluid amount threshold of bore fluid or more than an environment fluid amount threshold of external environment fluid;
the fluid temperature within the tubing annulus of the pipe segment matches an expected external environment temperature or an expected bore fluid temperature; or
any combination thereof.

10. The system of claim 9, wherein, when a breach is potentially present in the tubing of the pipe segment, the control sub-system is configured to determine the annulus monitoring integrity state at least in part by:
determining the annulus monitoring integrity state to indicate that the breach is potentially present in an inner barrier layer of the pipe segment when the fluid pressure within the tubing annulus of the pipe segment exceeds the upper fluid pressure threshold, when the fluid flow rate within the tubing annulus of the pipe segment exceeds the upper fluid flow rate threshold, when the fluid composition within the tubing annulus of the pipe segment includes more than the bore fluid amount threshold of bore fluid, when the fluid temperature within the tubing annulus of the pipe segment matches the expected bore fluid temperature, or any combination thereof; and determining the annulus monitoring integrity state to indicate that the breach is potentially present in an outer barrier layer of the pipe segment with the fluid pressure within the tubing annulus of the pipe segment drops below the lower fluid pressure threshold, when the fluid flow rate within the tubing annulus of the pipe segment drops below the lower fluid flow rate threshold, when the fluid composition within the tubing annulus of the pipe segment includes more than the environment fluid amount threshold of external environment fluid, when the fluid temperature within the tubing annulus of the pipe segment matches the expected external environment temperature, or any combination thereof.

11. The system of claim 6, wherein the control sub-system is configured to determine the cross-checked integrity state at least in part by:

determining the cross-checked integrity state to indicate that a breach is actually present in the tubing of the pipe segment when the bore monitoring integrity state indicates that a breach is potentially present and the annulus monitoring integrity state indicates that a breach is potentially present and when the bore monitoring integrity state indicates that a breach is not potentially present and the annulus monitoring integrity state indicates that a breach is potentially present; and determining the cross-checked integrity state to indicate that a breach is not actually present in the tubing of the pipe segment when the bore monitoring integrity state indicates that a breach is not potentially present and the annulus monitoring integrity state indicates that a breach is not potentially present and when the bore monitoring integrity state indicates that a breach is potentially present and the annulus monitoring integrity state indicates that a breach is not potentially present.

12. The system of claim 6, wherein the control sub-system is configured to:

adjust a breach bore pressure pattern used to determine the bore monitoring integrity state to decrease negative pressure wave sensitivity when the bore monitoring integrity state indicates that a breach is potentially present and the annulus monitoring integrity state indicates that a breach is not potentially present; and adjust the breach bore pressure pattern used to determine the bore monitoring integrity state to increase negative pressure wave sensitivity when the bore monitoring integrity state indicates that a breach is not potentially present and the annulus monitoring integrity state indicates that a breach is potentially present.

13. A method of operating a monitoring apparatus deployed in a pipeline system, comprising:

determining, using a control sub-system in the monitoring apparatus, a bore monitoring integrity state that indicates whether a breach is potentially present in a pipe segment deployed in the pipeline system based at least in part on first sensor data determined by a plurality of bore sensors in the monitoring apparatus to be indicative of one or more bore fluid parameters present within a pipe bore of the pipe segment;

determining, using the control sub-system, an annulus monitoring integrity state that indicates whether a breach is potentially present in the pipe segment based at least in part on second sensor data determined by one or more annulus sensors in the monitoring apparatus to be indicative of one or more annulus fluid parameters present within free space defined in a tubing annulus of the pipe segment; and determining, using the control sub-system, a cross-checked integrity state that indicates whether a breach is actually present in the pipe segment at least in part by cross-checking the bore monitoring integrity state and the annulus monitoring integrity state against one another.

14. The method of claim 13, wherein determining the bore monitoring integrity state comprises:

determining a plurality of bore pressure profiles each associated with a bore sensor in the plurality of bore sensors based at least in part on the first sensor data determined by the plurality of bore sensors;

determining a breach bore pressure pattern expected to be indicative of a breach being present in the pipe segment;

determining the bore monitoring integrity state to indicate that a breach is potentially present in the pipe segment in response to determining that the breach bore pressure pattern is detected in the plurality of bore pressure profiles; and determining the bore monitoring integrity state to indicate that a breach is not potentially present in the pipe segment in response to determining that the breach bore pressure pattern is not detected in the plurality of bore pressure profiles.

15. The method of claim 13, wherein determining the annulus monitoring integrity state comprises:

determining fluid pressure, fluid flow rate, fluid composition, fluid temperature, or any combination thereof present within the tubing annulus of the pipe segment based on the second sensor data determined by the one or more annulus sensors; and determining the annulus monitoring integrity state to indicate that a breach is potentially present in the pipe segment in response to:

determining that the fluid pressure within the tubing annulus of the pipe segment exceeds an upper fluid pressure threshold;

determining that the fluid pressure within the tubing annulus of the pipe segment drops below a lower fluid pressure threshold;

determining that the fluid flow rate within the tubing annulus of the pipe segment exceeds an upper fluid flow rate threshold;

determining that the fluid flow rate within the tubing annulus of the pipe segment drops below a lower fluid flow rate threshold;

determining that the fluid composition within the tubing annulus of the pipe segment includes more than a bore fluid amount threshold of bore fluid;

determining that that the fluid composition within the tubing annulus of the pipe segment includes more than an environment fluid amount threshold of external environment fluid;

determining that the fluid temperature within the tubing annulus of the pipe segment matches an expected external environment temperature;

determining that the fluid temperature within the tubing annulus of the pipe segment matches an expected bore fluid temperature; or any combination thereof.

16. The method of claim 13, wherein determining the cross-checked integrity state comprises:

determining the cross-checked integrity state to indicate that a breach is actually present in the pipe segment in response to determining that the bore monitoring integrity state indicates that a breach is potentially present and the annulus monitoring integrity state indicates that a breach is potentially present and in response to determining that the bore monitoring integrity state indicates that a breach is not potentially present and the annulus monitoring integrity state indicates that a breach is potentially present; and determining the cross-checked integrity state to indicate that a breach is not actually present in the pipe segment in response to determining that the bore monitoring integrity state indicates that a breach is not potentially present and the annulus monitoring integrity state indicates that a breach is not potentially present and in response to determining that the bore monitoring integrity state indicates that a breach is potentially present and the annulus monitoring integrity state indicates that a breach is not potentially present.

17. The method of claim 13, comprising adjusting a breach bore pressure pattern used to determine the bore monitoring integrity state to decrease negative pressure wave sensitivity in response determining that the bore monitoring integrity state indicates that a breach is potentially present and the annulus monitoring integrity state indicates that a breach is not potentially present; and adjusting the breach bore pressure pattern used to determine the bore monitoring integrity state to increase negative pressure wave sensitivity in response to determining that the bore monitoring integrity state indicates that a breach is not potentially present and the annulus monitoring integrity state indicates that a breach is potentially present.

18. The method of claim 17, wherein:

adjusting the breach bore pressure pattern to decrease negative pressure wave sensitivity comprises excluding a bore pressure pattern that resulted in the bore monitoring integrity state indicating that a breach is potentially present; and adjusting the breach bore pressure pattern to increase negative pressure wave sensitivity comprises:

determining a time when an annulus fluid parameter of the one or more annulus fluid parameters indicated by the second sensor data is initially indicative of a breach potentially being present in the pipe segment;

determining a bore pressure profile over a time period around the time when the annulus fluid parameter is initially indicative of a breach potentially being present in the pipe segment; and setting the breach bore pressure pattern based on a bore pressure pattern that occurs during the bore pressure profile.

19. A monitoring apparatus, comprising:

a plurality of bore sensors, wherein the plurality of bore sensors is configured to be fluidly connected to a pipe bore of a pipe segment to enable the plurality of bore sensors to determine first sensor data indicative of fluid pressure present within the pipe bore of the pipe segment;

one or more annulus sensors, wherein the one or more annulus sensors are configured to be fluidly connected to free space defined within a tubing annulus of the pipe segment to enable the one or more annulus sensors to determine second sensor data indicative of fluid pressure, fluid temperature, fluid flow rate, fluid composition, or any combination thereof present within the tubing annulus of the pipe segment; and a control sub-system configured to be communicatively coupled to the plurality of bore sensors and the one or more annulus sensors and to:

determine a bore monitoring integrity state that indicates whether a breach is potentially present in the pipe segment based on the first sensor data indicative of fluid pressure present within the pipe bore of the pipe segment;

determine an annulus monitoring integrity state that indicates whether a breach is potentially present in the pipe segment based on the second sensor data indicative of the fluid pressure, the fluid temperature, the fluid flow rate, the fluid composition, or any combination thereof present within the tubing annulus of the pipe segment; and determine a cross-checked integrity state that indicates whether a breach is actually present in the pipe segment based on the bore monitoring integrity state and the annulus monitoring integrity state.

20. The monitoring apparatus of claim 19, wherein the control sub-system is configured to:

determine the bore monitoring integrity state at least in part by:

determining a plurality of bore pressure profiles each associated with a bore sensor in the plurality of bore sensors based at least in part on the first sensor data indicative of fluid pressure present within the pipe bore of the pipe segment;

determining a breach bore pressure pattern expected to be indicative of a breach being present in the pipe segment;

determining the bore monitoring integrity state to indicate that a breach is potentially present in the pipe segment when the breach bore pressure pattern is detected in the plurality of bore pressure profiles; and determining the bore monitoring integrity state to indicate that a breach is not potentially present in the pipe segment when the breach bore pressure pattern is not detected in the plurality of bore pressure profiles;

determine the annulus monitoring integrity state at least in part by:

determining the annulus monitoring integrity state to indicate that a breach is potentially present in the pipe segment when the fluid pressure within the tubing annulus of the pipe segment exceeds an upper fluid pressure threshold, when the fluid pressure within the tubing annulus of the pipe segment drops below a lower fluid pressure threshold, when the fluid flow rate within the tubing annulus of the pipe segment exceeds an upper fluid flow rate threshold, when the fluid pressure within the tubing annulus of the pipe segment drops below a lower fluid flow rate threshold, when the fluid composition within the tubing annulus of the pipe segment includes more than a bore fluid amount threshold of bore fluid, when the fluid composition within the tubing annulus of the pipe segment includes more than an environment fluid amount threshold of external environment fluid, when the fluid temperature within the tubing annulus of the pipe segment matches an expected external environment temperature, when the fluid temperature within the tubing annulus of the pipe segment matches an expected bore fluid temperature, or any combination thereof; and determining the annulus monitoring integrity state to indicate that a breach is not potentially present in the pipe segment when the fluid pressure within the tubing annulus of the pipe segment does not exceed the upper fluid pressure threshold, when the fluid pressure within the tubing annulus of the pipe segment does not drop below the lower fluid pressure threshold, when the fluid flow rate within the tubing annulus of the pipe segment does not exceed the upper fluid flow rate threshold, when the fluid pressure within the tubing annulus of the pipe segment does not drop below the lower fluid flow rate threshold, when the fluid composition within the tubing annulus of the pipe segment does not include more than the bore fluid amount threshold of bore fluid, when the fluid composition within the tubing annulus of the pipe segment does not include more than the environment fluid amount threshold of external environment fluid, when the fluid temperature within the tubing annulus of the pipe segment does not match the expected external environment temperature, and when the fluid temperature within the tubing annulus of the pipe segment does not match the expected bore fluid temperature; and determine the cross-checked integrity state at least in part by:

determining the cross-checked integrity state to indicate that a breach is actually present in the pipe segment when the bore monitoring integrity state indicates that a breach is not potentially present and the annulus monitoring integrity state indicates that a breach is potentially present; and determining the cross-checked integrity state to indicate that a breach is not actually present in the pipe segment when the bore monitoring integrity state indicates that a breach is potentially present and the annulus monitoring integrity state indicates that a breach is not potentially present.

\* \* \* \* \*